US012348858B2

(12) United States Patent
Ren

(10) Patent No.: US 12,348,858 B2
(45) Date of Patent: Jul. 1, 2025

(54) VIDEO PROCESSING METHOD, ELECTRONIC DEVICE, AND READABLE MEDIUM

(71) Applicant: HONOR DEVICE CO., LTD., Shenzhen (CN)

(72) Inventor: Fujian Ren, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/266,091

(22) PCT Filed: Dec. 14, 2022

(86) PCT No.: PCT/CN2022/138961
§ 371 (c)(1),
(2) Date: Jun. 8, 2023

(87) PCT Pub. No.: WO2023/173850
PCT Pub. Date: Sep. 21, 2023

(65) Prior Publication Data
US 2024/0223889 A1 Jul. 4, 2024

(30) Foreign Application Priority Data
Mar. 15, 2022 (CN) .......................... 202210255907.7

(51) Int. Cl.
H04N 23/60 (2023.01)
G06V 20/40 (2022.01)
(Continued)

(52) U.S. Cl.
CPC ............. H04N 23/64 (2023.01); G06V 20/49 (2022.01); G06V 20/70 (2022.01); H04N 23/62 (2023.01)

(58) Field of Classification Search
CPC ........ H04N 23/64; H04N 23/62; G06V 20/49; G06V 20/70; G06V 20/41; G06V 10/764;
(Continued)

(56) References Cited

U.S. PATENT DOCUMENTS 9,712,730 B2 * 7/2017 Phillips .................. F16M 11/14
10,133,899 B2 * 11/2018 Ito ........................ G06F 16/7867
(Continued)

FOREIGN PATENT DOCUMENTS

CN 107124568 A 9/2017
CN 110180181 A 8/2019
(Continued)

OTHER PUBLICATIONS

Jason Cipriani;"Android users can snap photos while recording video again";CNET Tech Mobile;Apr. 20, 2016; Retrieved from the internet,URL:https://www.cnet.com/tech/mobile/new-google-camera-update-brings-back-ability-to-snap-photos-while-recording-video/, 2 total pages.
(Continued)

Primary Examiner — Hung H Lam
(74) Attorney, Agent, or Firm — WOMBLE BOND DICKINSON (US) LLP

(57) ABSTRACT

A video processing method, an electronic device, and a computer readable storage medium, and the video processing method includes: displaying a first interface and starting to shoot a first video in response to a first operation; obtaining the first video in a shooting process of the first video; capturing a plurality of featured images from the first video by using the magic moment; and saving the tag data of each transition of the first video and the tag data of the first video, and saving the featured images in response to a second operation. The electronic device may further capture a plurality of featured images from the first video by using
(Continued)

the magic moment in the tag data of the first video, so that a user obtains a featured instant photo while shooting the video.

20 Claims, 29 Drawing Sheets

(51) Int. Cl.
    *G06V 20/70*              (2022.01)
    *H04N 23/62*              (2023.01)

(58) Field of Classification Search
    CPC ............... G06F 16/739; G06F 16/745; H04M 2250/52; H04M 1/72403; H04M 1/72469; H04M 1/72439
    See application file for complete search history.

(56) References Cited

U.S. PATENT DOCUMENTS

| | | | | |
|---|---|---|---|---|
| 10,547,675 | B1* | 1/2020 | Lewis | H04N 21/8586 |
| 10,699,419 | B2* | 6/2020 | Cui | G05B 19/056 |
| 2003/0126604 | A1 | 7/2003 | Suh | |
| 2020/0273581 | A1* | 8/2020 | Wolf | G16H 40/63 |
| 2021/0382941 | A1 | 12/2021 | Wu et al. | |
| 2022/0230438 | A1 | 7/2022 | Chen et al. | |
| 2024/0276055 | A1* | 8/2024 | Huo | G06F 16/739 |
| 2024/0370134 | A1* | 11/2024 | Han | G06F 3/04845 |
| 2024/0373119 | A1* | 11/2024 | Zhu | H04N 23/632 |

FOREIGN PATENT DOCUMENTS

| | | |
|---|---|---|
| CN | 111061912 A | 4/2020 |
| CN | 111835957 A | 10/2020 |
| CN | 111866404 A | 10/2020 |
| CN | 112445935 A | 3/2021 |
| CN | 112532865 A | 3/2021 |
| CN | 113792694 A | 12/2021 |
| CN | 113810608 A | 12/2021 |
| CN | 113852755 A | 12/2021 |
| CN | 113852858 A | 12/2021 |
| CN | 113923391 A | 1/2022 |
| CN | 114827342 A | 7/2022 |
| JP | 2007067518 A | 3/2007 |

OTHER PUBLICATIONS

Peter Krogh;"Where does matadata live?";Mediagraph. io Blog; Jul. 1, 2020; pp. 1-6; Retrieved from the internet, URL:https://www.mediagraph.io/blog/where-does-metadata-live.

* cited by examiner

VIDEO PROCESSING METHOD, ELECTRONIC DEVICE, AND READABLE MEDIUM

CROSS-REFERENCE TO RELATED APPLICATIONS

This application is a national stage of International Application No. PCT/CN2022/138961, filed on Dec. 14, 2022, which claims priority to Chinese Patent Application No. 202210255907.7, filed on Mar. 15, 2022. The disclosures of both of the aforementioned applications are hereby incorporated by reference in their entireties.

TECHNICAL FIELD

This application relates to the technical field of electronic devices, and in particular, to a video processing method, an electronic device, a program product, and a computer-readable storage medium.

BACKGROUND

Currently, photo shooting and video recording functions have become essential functions of an electronic device. A demand and experience of a user for recording and photo shooting are also increasing. In some video shooting application scenarios, a user expects to capture a memorable featured instant photo while shooting a video.

Therefore, a method for obtaining a memorable featured instant photo while shooting a video needs to be provided.

SUMMARY

This application provides a video processing method, an electronic device, a program product, and a computer readable storage medium, so that a user can obtain a featured instant photo while shooting a video.

To achieve the foregoing objective, this application provides the following technical solutions:

According to a first aspect, this application provides a video processing method, applied to an electronic device, where the video processing method includes: displaying a first interface and starting to shoot a first video in response to a first operation, where the first interface is a shooting interface of a camera application, the first interface includes a first control, and the first control is configured to stop shooting of the first video; obtaining the first video in a shooting process of the first video; recognizing a theme, a transition, and a magic moment of the first video, to obtain tag data of each transition of the first video and tag data of the first video, where the transition is used to divide the first video into a plurality of video slices, and the tag data of each transition includes information about a video slice corresponding to the transition; and the tag data of the first video includes a theme tag, a magic moment, and a group ID of the first video; capturing a plurality of featured images from the first video by using the magic moment; and saving the tag data of each transition of the first video and the tag data of the first video, and saving the featured image in response to a second operation, where the featured image includes the group ID of the first video, and the second operation is a trigger operation for the first control.

It can be learned from the foregoing content that, when a user shoots a video by using the electronic device, the electronic device may obtain the shot first video and the tag data of the first video. The electronic device may further capture a plurality of featured images from the first video by using the magic moment in the tag data of the first video, so that a user obtains a featured instant photo while shooting the video.

In a possible implementation, the recognizing a theme, a transition, and a magic moment of the first video, to obtain tag data of each transition of the first video and tag data of the first video includes: when recognizing that a transition in the first video ends, generate tag data of the transition by using information about a video slice corresponding to the transition; and when shooting of the first video ends, generating the tag data of the first video by using the theme, the magic moment, and the group ID of the first video.

In a possible implementation, the saving the tag data of each transition of the first video and the tag data of the first video, and saving the featured image in response to a second operation includes: writing the tag data of each transition and the tag data of the first video into a video header of the first video in response to the second operation.

In a possible implementation, the writing the tag data of each transition and the tag data of the first video into a video header of the first video includes: receiving, by a media recorder, the tag data of each transition and the tag data of the first video that are sent by the camera application; and writing, by the media recorder, the tag data of each transition and the tag data of the first video into the video header of the first video.

In a possible implementation, the recognizing a theme, a transition, and a magic moment of the first video, to obtain tag data of each transition of the first video and tag data of the first video includes: recognizing, by a camera Hal, the theme, the transition, and the magic moment of the first video, to obtain the tag data of each transition of the first video and the tag data of the first video.

In a possible implementation, before the recognizing, by a camera Hal, the theme, the transition, and the magic moment of the first video, to obtain the tag data of each transition of the first video and the tag data of the first video, the method further includes: receiving, by the camera Hal, a first control command sent by the camera application, where the first control command is obtained by the camera application in response to the first operation, and the first operation includes a touch operation performed by a user on a control for controlling shooting.

In a possible implementation, the capturing a plurality of featured images from the first video by using the magic moment includes: capturing images at the magic moment from the first video; and selecting, as the featured images, a plurality of images with a high highlight degree score from the images at the magic moment.

In a possible implementation, the capturing a plurality of featured images from the first video by using the magic moment includes: capturing, by the camera Hal, a plurality of featured images from the first video by using the magic moment.

In a possible implementation, the video processing method further includes: sending, by the camera application, a storage path of the first video to a media provider when shooting of the first video ends; and saving, by the media provider, the storage path of the first video.

In a possible implementation, the video processing method further includes: obtaining, by a media library, data saved in the media provider, where the data includes at least the storage path of the first video; obtaining, by the media library, the first video by using the storage path of the first video; and obtaining, by the media library, the group ID of the first video stored in the video header of the first video.

In a possible implementation, the video processing method further includes: obtaining the first video in response to a third operation, where the third operation is a browse operation of the first video; obtaining the featured image in the first video; and displaying a browse interface of the first video, where the browse interface of the first video includes the first video and a thumbnail of the featured image in the first video.

In this possible implementation, when the user enters the third operation to browse the first video, the electronic device may obtain the featured image in the first video, and display the first video and the featured image in the first video on the browse interface of the first video, so that the user can view the video and the featured image in the video on the browse interface of the video.

In a possible implementation, the obtaining the first video in response to a third operation; obtaining the featured image in the first video; and displaying a browse interface of the first video includes: obtaining, by a gallery application, the first video in response to the third operation; obtaining, by the gallery application, the featured image in the first video; and displaying, by the gallery application, the browse interface of the first video.

In a possible implementation, the obtaining, by a gallery application, the first video in response to the third operation includes: obtaining, by the gallery application, the storage path of the first video from the media library in response to the third operation; and obtaining, by the gallery application, the first video by using the storage path of the first video.

In a possible implementation, the video processing method further includes: obtaining the first video in response to a generation operation of a selected video; and generating the selected video by using the first video, where the selected video includes the image at the magic moment of the first video.

In this possible implementation, the electronic device obtains the first video in response to the generation operation of the selected video; and generates the selected video by using the first video, so that the user obtains a featured instant photo while shooting the video, and further obtains a small video of the first video, so as to facilitate sharing by the user.

In a possible implementation, the obtaining the first video in response to a generation operation of a selected video; and generating the selected video by using the first video, where the selected video includes the image at the magic moment of the first video includes: obtaining, by a video editing application, the first video in response to the generation operation of the selected video; and generating, by the video editing application, the selected video by using the first video, where the selected video includes the image at the magic moment of the first video.

In a possible implementation, the obtaining, by a video editing application, the first video in response to the generation operation of the selected video includes: receiving, by the video editing application in response to the generation operation of selected video, the storage path that is of the first video and that is sent by the gallery application; and obtaining, by the video editing application, the first video by using the storage path of the first video.

In a possible implementation, the video processing method further includes: saving the selected video in response to a save operation of the selected video.

According to a second aspect, this application provides an electronic device, including: one or more processors, a memory, a camera, and a display screen, where the memory, the camera, and the display screen are coupled to the one or more processors, the memory is configured to store computer program code, the computer program code includes computer instructions, and when the one or more processors execute the computer instructions, the electronic device performs the video processing method according to any one of the implementations of the first aspect.

According to a third aspect, this application provides a computer readable storage medium, configured to store a computer program, where when executed, the computer program is specifically configured to implement the video processing method according to any one of the implementations of the first aspect.

According to a fourth aspect, this application provides a computer program product, where when the computer program product runs on a computer, the computer is enabled to perform the video processing method according to any one of the implementations of the first aspect.

DESCRIPTION OF EMBODIMENTS

Figure 1:
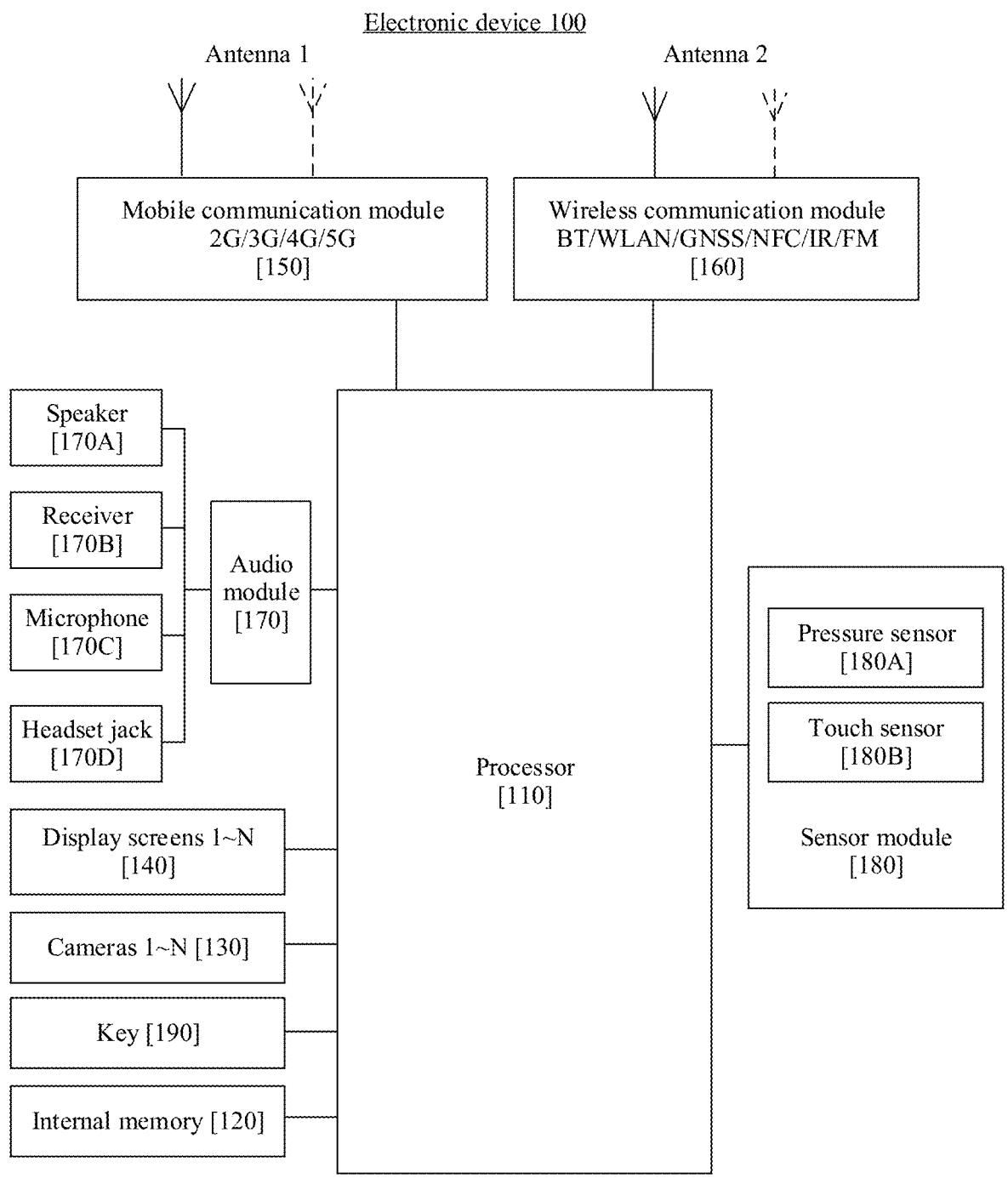
FIG. 1 is a diagram of a hardware structure of an electronic device according to this application.

The following clearly and completely describes the technical solutions in the embodiments of this application with reference to the accompanying drawings in the embodiments of this application. Terms used in the following embodiments are only for the purpose of describing particular embodiments and are not intended for limiting this application. The singular forms "one", "a", "the", "the foregoing", "this", and "the one" used in this specification and the appended claims of this application are also intended to include forms such as "one or more", unless otherwise clearly specified in the context. It should be further understood that in the embodiments of this application, "one or more" means one, two, or more than two; and the term "and/or" describes an association relationship between associated objects and represents that three relationships may exist. For example, "A and/or B" may represent that only A exists, both A and B exist, and only B exists, where A and B may be singular or plural. The character "/" generally indicates an "or" relationship between the associated objects.

Reference to "one embodiment" or "some embodiments" described in this specification or the like means that one or more embodiments of this application include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise specifically emphasized. Terms "comprise", "include", "have", and variations thereof all mean "including but not limited to", unless otherwise specifically emphasized.

"A plurality of" in embodiments of this application means two or more. It should be noted that in the description of the embodiments of this application, words such as "first" and "second" are merely used for distinguishing between descriptions, and cannot be understood as an indication or implication of relative importance, or cannot be understood as an indication or implication of a sequence.

Before embodiments of this application are described, some terms or concepts used in embodiments of this application are first explained. It should be understood that, names of the following terms are not specifically limited in this application. The following terms may have other names. Renamed terms still satisfy the following related term explanations.

1) Magic Take: a function that may be understood as follows: When a user uses a camera application to shoot a video, a shot original video, one or more featured photos, and one or more selected videos can be obtained by pressing a "shoot" icon once. It may be understood that, duration of the highlight short video obtained through "Magic Take" is less than duration of a complete video. For example, the duration of the recorded entire complete video is one minute. In this case, five photos of magic moments and four highlight short videos with duration of 15 seconds can be obtained. It may be further understood that, Magic Take may alternatively have other names, for example, one key for multiple gains, one key for multiple shots, one key for video clipping, one key for long video, AI one key for long video.

2) A featured image refers to pictures of some featured instants in a video recording process. For example, the featured image may be an optimal moving instant picture, an optimal expression moment picture, or an optimal check-in action picture. It may be understood that the term "featured image" is not limited in this application, and the featured image may also be referred to as a beautiful moment image, a magic moment image, a featured instant image, a decisive instant image, a best shot (best shot, BS) image, an AI image, or the like. In different scenes, featured images may be different types of instant images. For example, when a football game video is shot, the featured image may be an image of an instant at which an athlete's foot touches the football, or an image of an instant at which the football is kicked off by an athlete at the time of shooting or passing the football. The featured image may alternatively be an image of an instant at which the football enters the goal, or an image of an instant at which the goalkeeper catches the football. When a video of a person jumping from the ground is shot, the featured image may be an image of an instant at which the person is at the highest point in the air, or may be an image of an instant at which the person acts most stretched when the person is in the air. When a scene is shot, the featured image may be an image of a building appearing in the scene, or may be an image of a sunset or a sunrise.

3) A selected video is a video that contains a featured image. It may be understood that the term "selected video" is also not limited in this application, and the selected video may also be referred to as a highlight video, a highlight short video, a highlight small video, an AI video, or the like.

4) Tag (TAG): TAGs may be divided into a theme TAG, a scene TAG, a featured image TAG, a sub-lens TAG, and the like. The theme TAG is used to indicate a style or an atmosphere of a video. The scene TAG is used to indicate a scene of a video. The featured image TAG is used to indicate a location of a featured image in a shot video, and the sub-lens TAG (which may also be referred to as a transition TAG) is used to indicate a location of a transition scene in a shot video. For example, a video includes one or more featured image TAGs, and the featured image TAG may indicate that image frames at moments such as the 10th second and the first minute and 20th second of the video are featured images. The video also includes one or more sub-lens TAGs, and the sub-lens TAG may indicate to switch from a first scene to a second scene at the 15th second of the video and switch from the second scene to a third scene at the third minute and 43rd second of the video.

Currently, photo shooting and video recording functions have become essential functions of an electronic device. A demand and experience of a user for video recording and photo shooting are also increasing. In some video shooting application scenarios, a user expects to capture a memorable featured instant photo while shooting a video. Based on this, in this application, a "Magic Take" mode is set in the electronic device, that is, when the electronic device shoots a video in a video mode, a featured image in a video stream is automatically extracted by analyzing the video stream. In addition, when video shooting is completed, the electronic device may further generate one or more selected videos. In addition, a user can view the shot video, the featured image, and the selected video in an application such as a gallery.

To support the "Magic Take" mode of the electronic device, an embodiment of this application provides a video processing method. In addition, the video processing method provided in this embodiment of this application may be applied to a mobile phone, a tablet computer, a desktop computer, a laptop computer, a notebook computer, an ultra-mobile personal computer (Ultra-mobile Personal Computer, UMPC), a handheld computer, a netbook, a personal digital assistant (personal digital assistant, PDA), a wearable electronic device, a smartwatch, or the like.

The mobile phone is used as an example. FIG. 1 shows an example of composition of an electronic device according to an embodiment of this application. As shown in FIG. 1, an electronic device 100 may include a processor 110, an internal memory 120, a camera 130, a display screen 140, an antenna 1, an antenna 2, a mobile communication module 150, a wireless communication module 160, an audio module 170, a sensor module 180, a key 190, and the like.

It can be understood that a structure shown in this embodiment does not constitute a specific limitation on the electronic device 100. In some other embodiments, the electronic device 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a sensor hub (sensor hub), and/or a neural-network processing unit (neural-network processing unit, NPU). Different processing units may be independent devices, or may be integrated into one or more processors.

The processor 110 may further be configured with a memory configured to store an instruction and data. In some embodiments, the memory in the processor 110 is a cache memory. The memory may store an instruction or data that is just used or used cyclically by the processor 110. If the processor 110 needs to use the instruction or the data again, the instruction or the data may be directly invoked from the memory. Repeated access is avoided, and waiting time of the processor 110 is reduced, thereby improving system efficiency.

The internal memory 120 may be configured to store computer-executable program code, and the computer-executable program code includes instructions. The processor 110 runs the instructions stored in the internal memory 120, to execute various function applications and data processing of the electronic device 100. The internal memory 120 may include a program storage area and a data storage area. The program storage area may store an operating system, an application program required by at least one function (such as a sound playback function and an image display function), and the like. The data storage area may store data (such as audio data and an address book) created during use of the electronic device 100, and the like. In addition, the internal memory 120 may include a high-speed random access memory, and may further include a non-volatile memory, such as at least one magnetic disk storage device, a flash memory device, and a universal flash storage (universal flash storage, UFS). The processor 110 performs various function applications and data processing of the electronic device 100 by running the instructions stored in the internal memory 120 and/or instructions stored in a memory provided in the processor.

In some embodiments, the internal memory 120 stores instructions used to perform the video processing method. The processor 110 may implement, by executing the instructions stored in the internal memory 120, controlling the electronic device to shoot a video in the "Magic Take" mode, to obtain a shot video, one or more featured photos, and one or more selected videos.

The electronic device implements a display function through the GPU, the display screen 140, the application processor, and the like. The GPU is a microprocessor for image processing, and is connected to the display screen 140 and the application processor. The GPU is configured to perform mathematical and geometric calculation, and is configured to render an image. The processor 110 may include one or more GPUs that execute a program instruction to generate or change display information.

The display screen 140 is configured to display an image, a video, and the like. The display screen 140 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device may include 1 or N display screens 140, where N is a positive integer greater than 1.

In some embodiments, the electronic device shoots a video in the "Magic Take" mode, to obtain a shot video, one or more featured photos, and one or more selected videos, and the display screen 140 displays them to the user.

The electronic device 100 may implement a shooting function through the ISP, the camera 130, the video codec, the GPU, the display screen 140, the application processor, and the like.

The ISP is configured to process data fed back by the camera 130. For example, during photo taking, a shutter is pressed, a ray of light is transmitted to a light-sensitive element of the camera lens through a lens, an optical signal is converted into an electrical signal, and the light-sensitive element of the camera lens transmits the electrical signal to the ISP for processing, and converts the electrical signal into an image that can be seen. The ISP may further optimize an algorithm for noise, brightness, and complexion. The ISP may further optimize parameters such as exposure and a color temperature of a shooting scene. In some embodiments, the ISP may be arranged in the camera 130.

The camera 130 is configured to capture a static image or a video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 100 may include 1 or N cameras 130, where N is a positive integer greater than 1.

In some embodiments, the camera 130 is configured to shoot the video mentioned in this embodiment of this application.

The digital signal processor is configured to process a digital signal, and may further process another digital signal in addition to a digital image signal. For example, when the electronic device 100 performs frequency channel selection, the digital signal processor is configured to perform Fourier transformation and the like on frequency channel energy.

The video codec is configured to compress or decompress a digital video. The electronic device 100 can support one or more video codecs. Therefore, the electronic device 100 may play or record videos in a plurality of encoding formats, such as moving picture experts group (moving picture experts group, MPEG) 4, MPEG2, MPEG3, and MPEG4.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover a single communication frequency band or a plurality of communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 150 can provide a solution for wireless communication including 2G/3G/4G/5G and the like to be applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some of functional modules of the mobile communication module 150 may be disposed in the processor 110. In some embodiments, at least some of the functional modules of the mobile communication module 150 may be disposed in a same device as at least some of modules of the processor 110.

The wireless communication module 160 can provide a solution for wireless communication including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), an infrared technology (infrared, IR) and the like to be applied to the electronic device 100. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

The electronic device may implement audio functions by using the audio module 170, a speaker 170A, a receiver 170B, a microphone 170C, a headset jack 170D, the application processor, and the like, for example, music playing and sound recording.

The audio module 170 is configured to convert digital audio information into analog audio signal output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device can listen to music by using the speaker 170A, or receive a hands-free call.

The receiver 170B, also referred to as a "telephone receiver", is configured to convert an audio electrical signal into a sound signal. When the electronic device receives a call or a voice message, the receiver 170B can be placed close to an ear to receive the voice.

The microphone 170C, also referred to as a "mic" or "mike", is configured to convert sound signals into electrical signals. When making a call or sending a voice message, a user can make a sound near the microphone 170C through the mouth of the user to input a sound signal to the microphone 170C. At least one microphone 170C may be disposed on the electronic device. In some other embodiments, two microphones 170C may be disposed on the electronic device, to implement a noise reduction function in addition to sound signal collection. In some other embodiments, three, four, or more microphones 170C may be disposed on the electronic device, to collect a sound signal, reduce noise, recognize a sound source, implement a directional recording function, and the like.

The headset jack 170D is configured to connect to a wired headset. The headset jack 170D may be a USB interface, or may be a 3.5 mm open mobile terminal platform (open mobile terminal platform, OMTP) standard interface, or a cellular telecommunications industry association of the USA (cellular telecommunications industry association of the USA, CTIA) standard interface.

In the sensor module 180, the pressure sensor 180A is configured to sense a pressure signal, and can convert the pressure signal into an electrical signal. In some embodiments, the pressure sensor 180A may be disposed on the display screen 140. There are many types of pressure sensors 180A, for example, a resistive pressure sensor, an inductive pressure sensor, and a capacitive pressure sensor. The capacitive pressure sensor may be a parallel plate including at least two conductive materials. When a force is applied to the pressure sensor 180A, capacitance between electrodes changes. The electronic device determines intensity of pressure based on a change of the capacitance. When a touch operation is performed on the display screen 140, the electronic device detects strength of the touch operation by using the pressure sensor 180A. The electronic device may also calculate a touch location based on a detected signal of the pressure sensor 180A. In some embodiments, touch operations that are applied to a same touch location but have different touch operation intensity may correspond to different operation instructions.

The touch sensor 180B is also referred to as a "touch device". The touch sensor 180B may be arranged on the display screen 140. The touch sensor 180B and the display screen 140 form a touchscreen, which is also referred to as a "touch screen". The touch sensor 180B is configured to detect a touch operation performed on or near the touch sensor 180B. The touch sensor may transfer the detected touch operation to the application processor to determine a type of the touch event. A visual output related to a touch operation may be provided by using the display 140. In some other embodiments, the touch sensor 180B may alternatively be disposed on a surface of the electronic device, which is different from the location of the display screen 140.

In some embodiments, the pressure sensor 180A and the touch sensor 180B may be configured to detect a touch operation performed by the user on a control, an image, an icon, a video, and the like that are displayed on the display screen 140. The electronic device may perform a corresponding procedure in response to a touch operation detected by the pressure sensor 180A and the touch sensor 180B. For specific content of the procedure performed by the electronic device, refer to the following embodiment content.

The key 190 includes a power key, a volume key, and the like. The key 190 may be a mechanical key, or may be a touch-sensitive key. The electronic device may receive key input, and generate key signal input related to user settings and function control of the electronic device.

The technical solutions described in the following embodiment can all be implemented in the electronic device 100 having the hardware architecture described above.

For ease of understanding, in the following embodiments of this application, the video processing method provided in embodiments of this application is described in detail by using an electronic device having the structure shown in FIG. 1 as an example.

In the following embodiments of this application, an example in which an electronic device is a mobile phone, a camera application is installed in the mobile phone, and the camera application starts a camera to shoot a video is used to describe in detail the video processing method provided in this application.

In some embodiments of this application, the user can manually enable or disable a "Magic Take" function provided in embodiments of this application. The following describes the entry of "Magic Take" with reference to FIG. 2A to FIG. 2D.

Figure 2A:
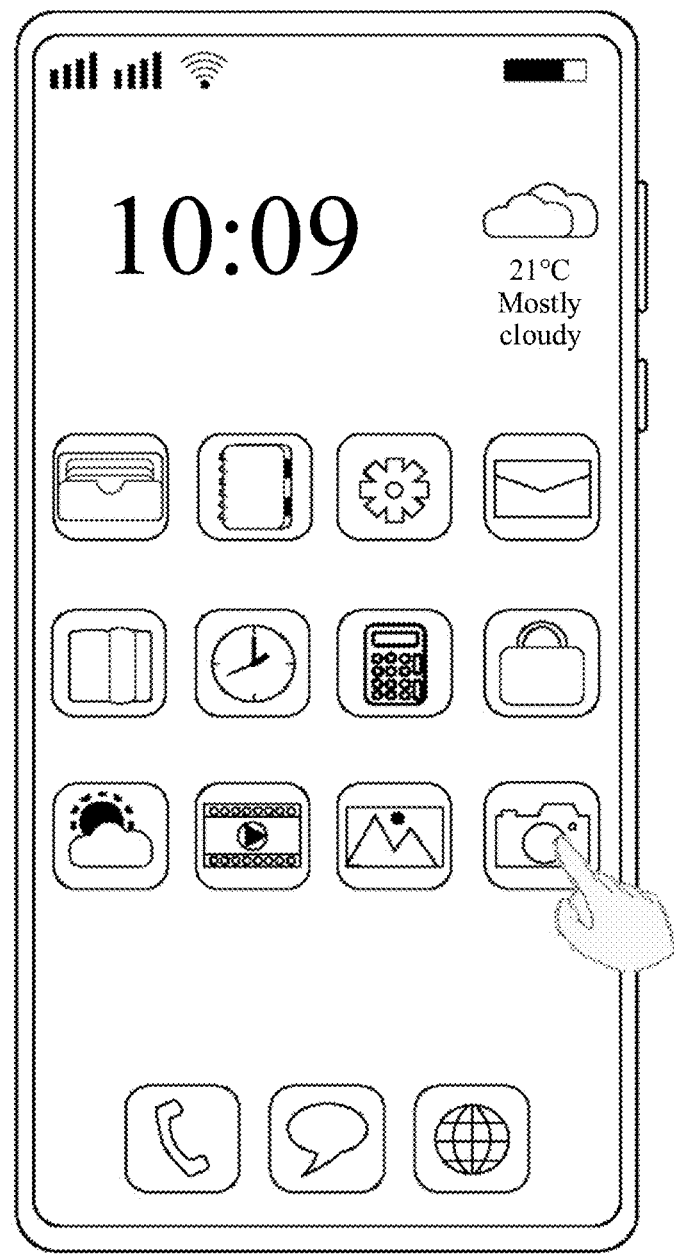
FIG. 2A to FIG. 2D are a schematic diagram of an example of enabling "Magic Take" according to an embodiment of this application.

For example, the user can instruct the mobile phone to start the camera application by touching a specific control on a screen of the mobile phone, pressing a specific physical key or key combination, inputting a voice, a mid-air gesture, or the like. FIG. 2A shows an implementation in which the user enables the camera application. As shown in FIG. 2A, the user taps a camera application icon displayed on the display screen of the mobile phone to enter an indication for enabling the camera. After the mobile phone responds to receiving the indication for enabling the camera by the user, the mobile phone starts the camera to display the shooting interface shown in FIG. 2B or FIG. 2C.

Figure 2B:
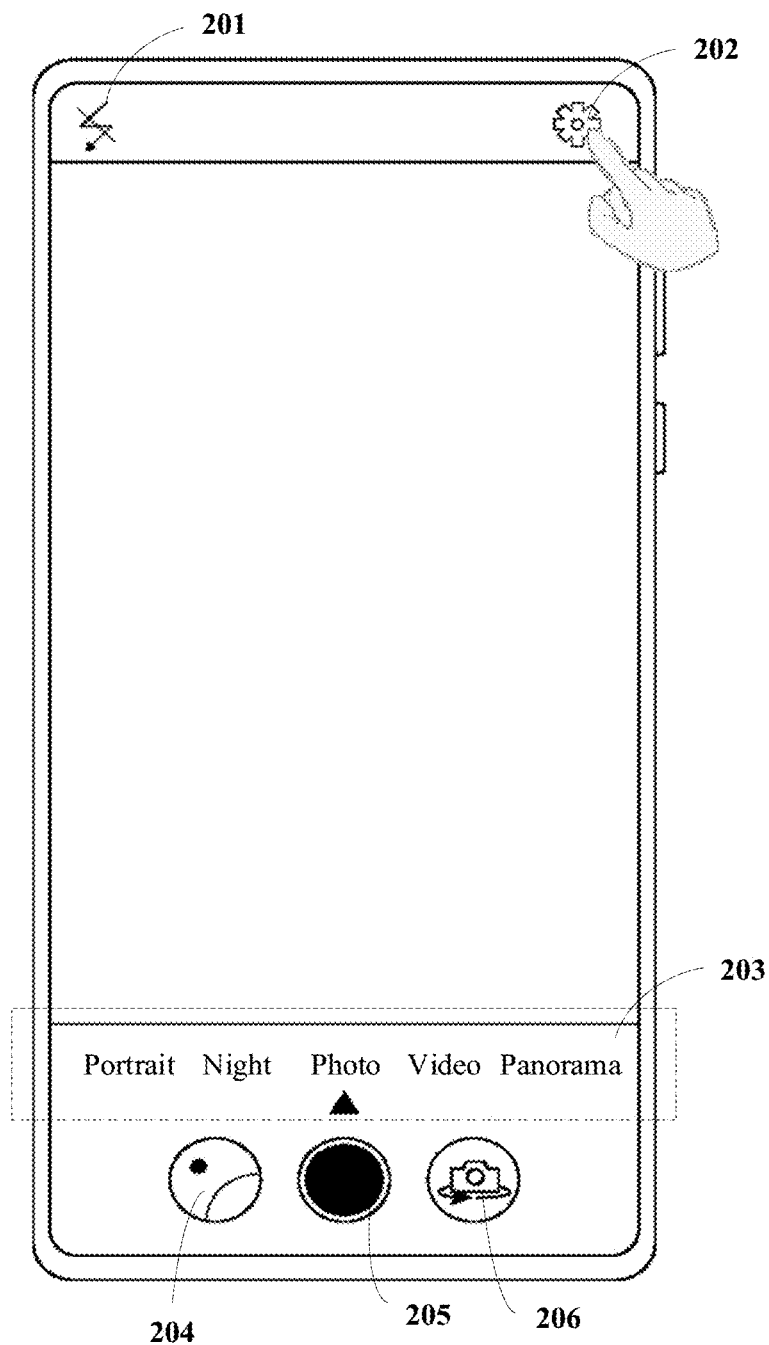
Figure 2C:
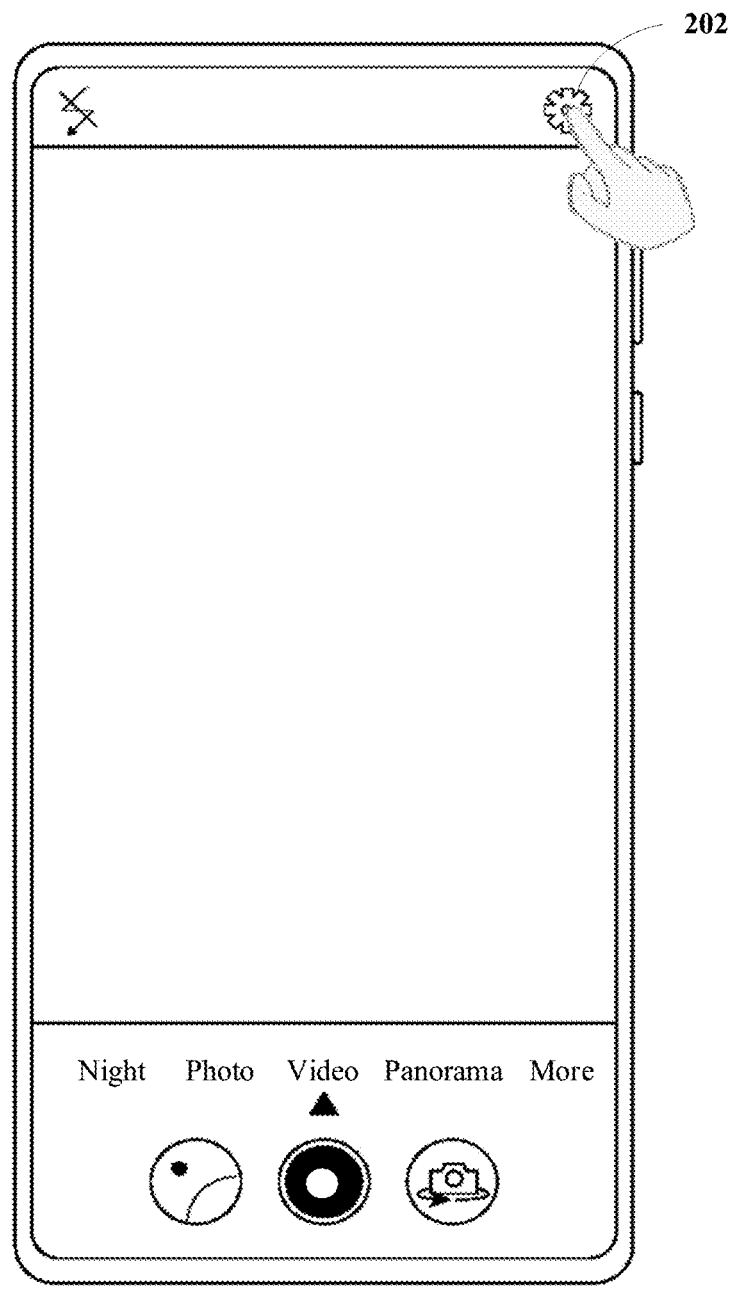

The shooting interface shown in FIG. 2B is a shooting interface when the mobile phone is in a photo mode, and the shooting interface shown in FIG. 2C is a shooting interface when the mobile phone is in a video mode. Using FIG. 2B as an example, the shooting interface of the mobile phone includes: a control 201 for enabling or disabling a flash, a settings control 202, a switching list 203, a control 204 for displaying a previously shot image, a control 205 for controlling shooting, a control 206 for switching between a front-facing camera and a rear-facing camera, and the like.

The control 201 for enabling or disabling the flash is used to control whether to enable the flash when the camera shoots.

The settings control 202 may be used to set a shooting parameter and a shooting function, for example, a photo scale setting, a gesture shooting setting, a smiling face shooting setting, and a video resolution setting.

The switching list 203 includes a plurality of modes of the camera, and the user may slide the switching list left and right to implement switching and running of the plurality of modes of the camera. For example, the switching list shown in FIG. 2B includes portrait, night, photo, video, and panorama. Another mode that is not shown in FIG. 2B belongs to hidden display, and the user may display, by sliding the list left and right, the mode that is in hidden display.

The control 204 for displaying the previously shot image is used to display a thumbnail of the previously shot image or a cover thumbnail of a previously shot video of the camera. The user may display, by touching the control 204 for displaying the previously shot image, the image or video previously shot by the camera. The image or video previously shot by the camera is an image or video whose shot time is before the current shooting and is the closest to the current shot time.

The control 205 for controlling shooting is a control provided for starting shooting by the user. In the photo mode of the mobile phone, the user touches once the control 205 for controlling shooting, and the camera may shoot one frame of image. Certainly, the camera may also shoot a plurality of frames of images, and only one frame of image is selected for outputting an image. In the video mode of the mobile phone, the user taps the control 205 for controlling shooting, and the camera starts video recording.

The control 206 for switching the front-facing camera and the rear-facing camera is used to switch and run a plurality of cameras of the mobile phone. Generally, the mobile phone includes a camera on a same side as the display screen (the front-facing camera for short), and a camera on a housing of the mobile phone (the rear-facing camera for short). The user may switch and run the front-facing camera and the rear-facing camera of the mobile phone by tapping the control 206 for switching the front-facing camera and the rear-facing camera.

As shown in FIG. 2B or FIG. 2C, the user controls, by tapping the settings control 202, the mobile phone to display a settings interface. For example, the settings interface may be shown in FIG. 2D. The settings interface shown in FIG. 2D displays an option 207 for enabling "Magic Take", which is used to enable the "Magic Take" function. That is, after the user enables the function, when the mobile phone is in the video mode to shoot a video, the mobile phone automatically uses the video processing method provided in this embodiment of this application to automatically generate a featured image and a short video while shooting the video. Certainly, the user can manually disable the "Magic Take" function in the video mode by using the option 207.

Figure 2D:
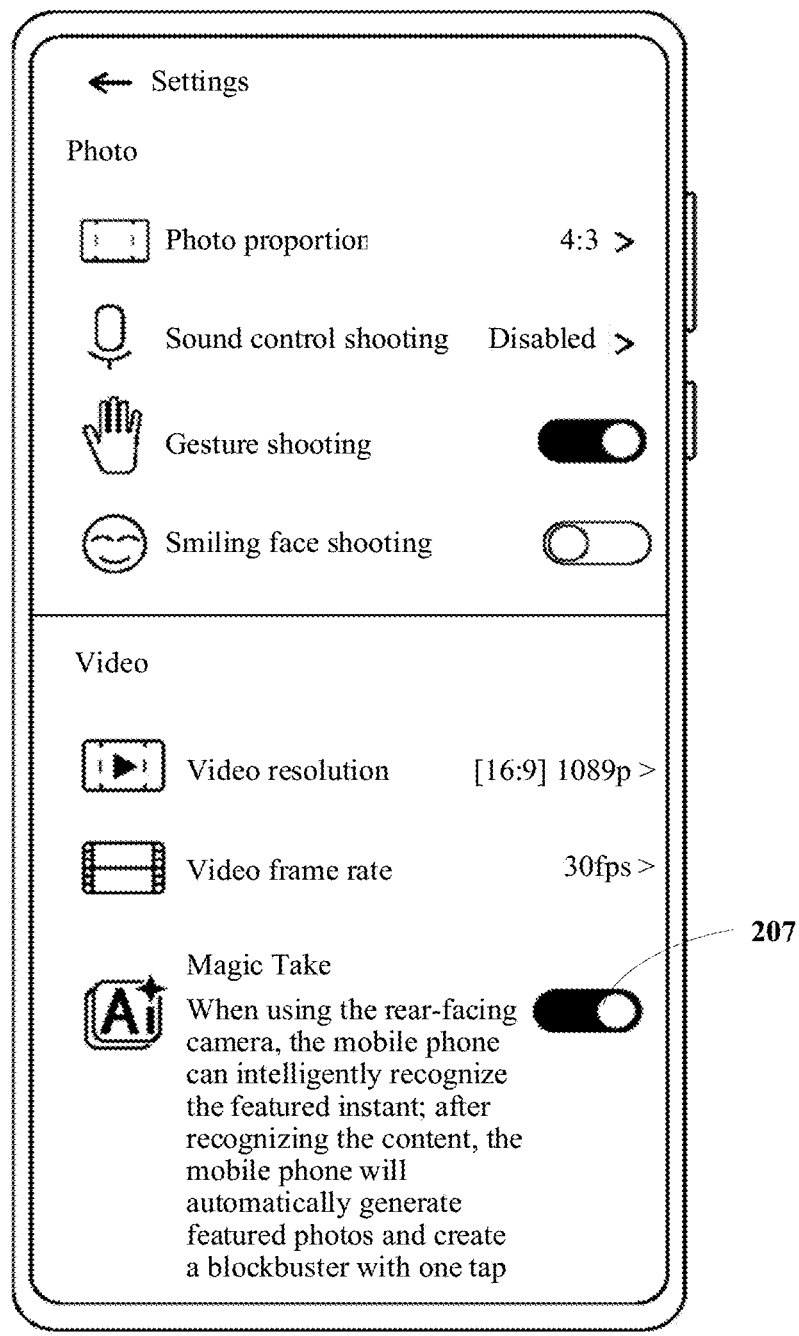

Generally, the option 207 of "Magic Take" shown in FIG. 2D is in a default enabled state. That is, when the mobile phone is powered on for the first time or the system is updated to have the "Magic Take" function, the option 207 of "Magic Take" in the settings interface shown in FIG. 2D is enabled, and the "Magic Take" function of the mobile phone is enabled.

It may be understood that the settings interface may further include a control for setting another function. For example, a control for shooting settings and a control for video settings shown in FIG. 2D. The control for shooting settings includes: a control for setting a photo scale, a control for setting a voice-controlled shooting, a control for setting a gesture shooting, a control for setting smiling face shooting, and the like. The control for video settings includes: a control for setting a video resolution, a control for setting a video frame rate, and the like.

The foregoing describes the method for controlling the mobile phone to enter the "Magic Take" mode, but this application is not limited to entering "Magic Take" in the video mode. In some embodiments of this application, the user can enable the "Magic Take" function in another manner.

The user can control the mobile phone to start shooting a video after the "Magic Take" function is enabled.

Figure 3A:
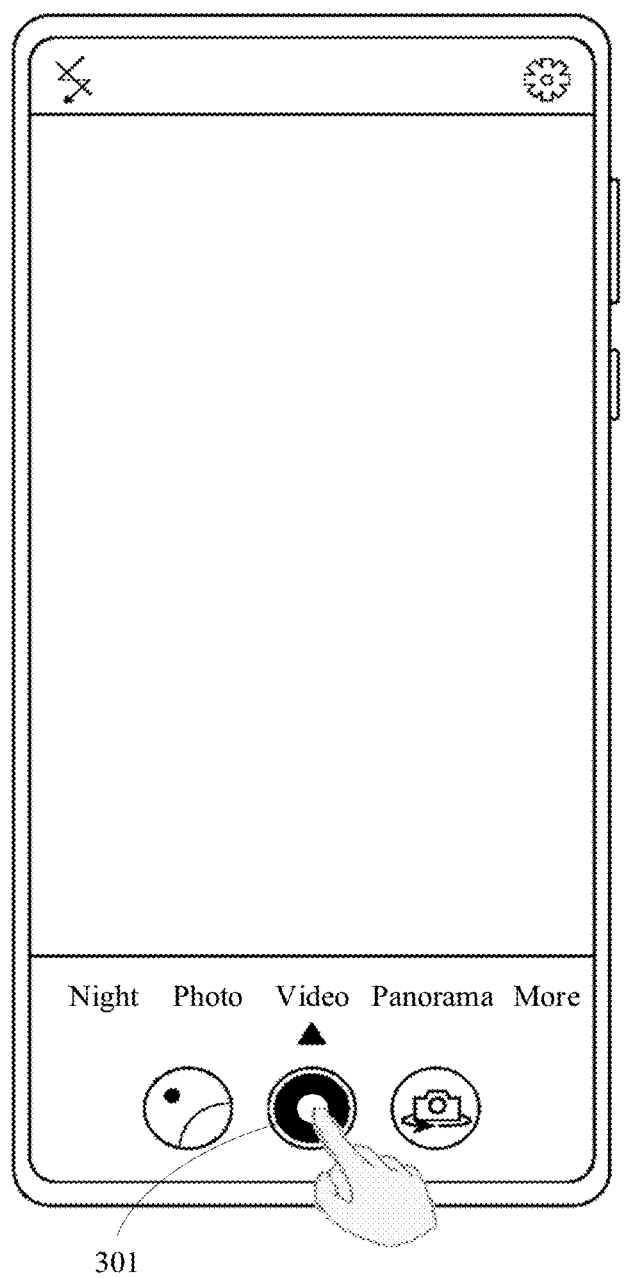
FIG. 3A to FIG. 3D are a schematic diagram of a graphical user interface of an example of "Magic Take" according to an embodiment of this application.
Figure 3B:
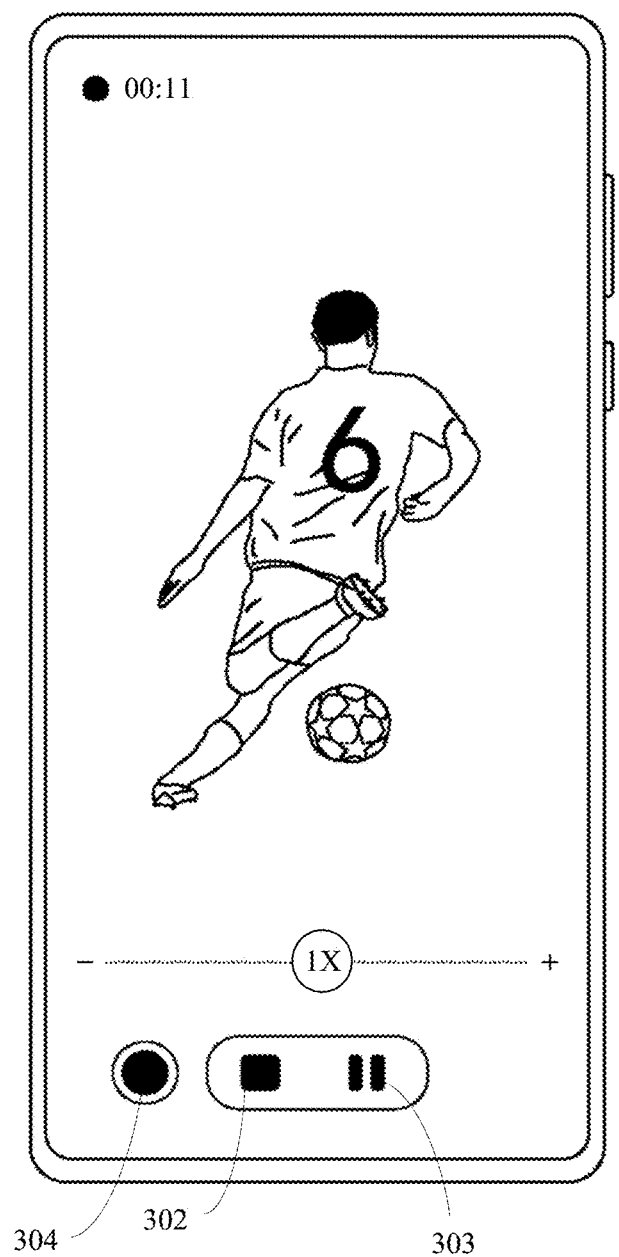

For example, referring to FIG. 2A, the user may tap the camera application to start the camera to start image collection, and display a preview interface to the user. As shown in FIG. 3A, the user may tap the control 301 for controlling shooting to control the mobile phone to start to record an image collected by the camera. That the mobile phone starts to record the image collected by the camera may be understood as: recording the image collected by the camera, and saving the image to an internal memory. An interface drawn in FIG. 3B shows a picture in a process in which the user shoots a football match by using the mobile phone. The interface drawn in FIG. 3B includes a stop control 302, a pause control 303, and a shoot key 304. In a video shooting process, the user may pause shooting by tapping the pause control 303, or may end shooting by tapping the stop control 302, or may manually capture a photo by tapping the shoot key 304.

Figure 3C:
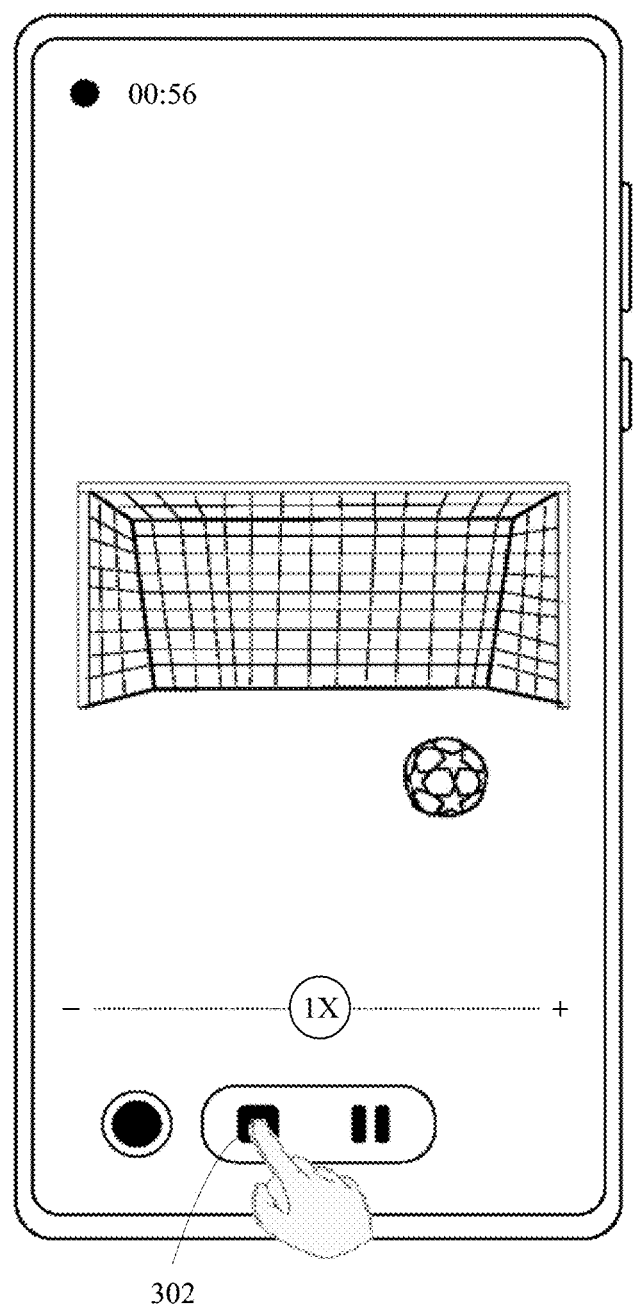
Figure 3D:
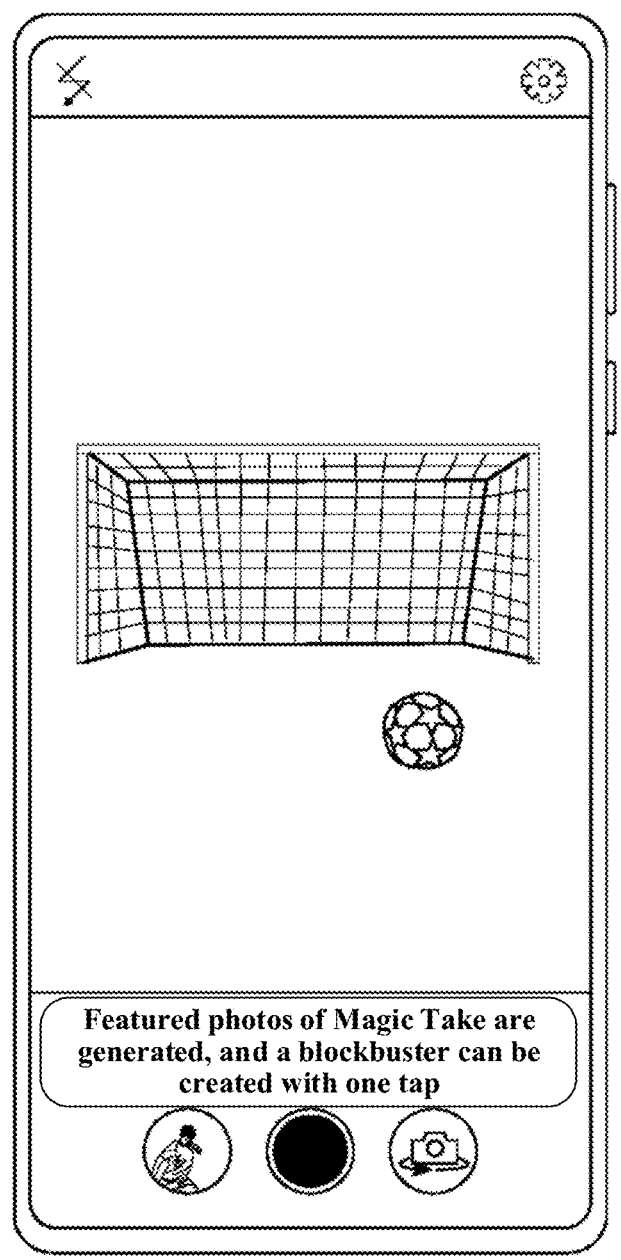

In an interface shown in FIG. 3C, the user may tap the stop control 302 to end a shooting process at the 56th second, to obtain a video whose duration is 56 seconds. After shooting, the display screen of the mobile phone can enter the shooting interface. In addition, when the "Magic Take" function of the mobile phone is first used, a generation reminder of Magic Take may be further guided on the shooting interface. For example, the shooting interface shown in FIG. 3D shows a dialog box for the generation reminder of Magic Take, and the dialog box shows a text reminder that a featured photo of "Magic Take" has been generated and a blockbuster can be created with one tap". The user may tap any area of the interface shown in FIG. 3D to control disappearing of the dialog box for the generation reminder of Magic Take. Alternatively, the mobile phone may be configured to display the dialog box for the generation reminder of Magic Take for specific duration, for example, 5 seconds, and then the dialog box disappears automatically.

Certainly, after the "Magic Take" function of the mobile phone is enabled once, the user shoots a video again, and taps the stop control to end shooting. A shooting interface displayed on the display screen of the mobile phone does not include the generation reminder for guiding Magic Take.

It should be noted that when duration of shooting a video by the mobile phone meets a requirement of specific duration, for example, 15 seconds, the mobile phone needs to capture one or more featured images from the video shot by the mobile phone as required by the Magic Take mode, and generate a selected video. When the mobile phone can capture one or more featured images, the shooting interface drawn in FIG. 3D may display the dialog box for the generation reminder of Magic Take, and the dialog box displays a text reminder that a featured photo of "Magic Take" has been generated and a blockbuster can be created with one tap".

However, application scenarios in which the user shoots a video may further include the following two application scenarios: A first application scenario: The video shooting duration is relatively short, and does not meet a video shooting duration requirement of the Magic Take mode. Second application scenario: The video shooting duration meets the video shooting duration requirement of the Magic Take mode, but the mobile phone does not recognize a featured image from the shot video. In addition, in the second application scenario, a time for shooting by the user is usually required to be greater than another duration requirement, and the duration is greater than video shooting duration of the Magic Take mode, for example, 30 seconds. In addition, although the mobile phone does not recognize a featured image from the shot video, the mobile phone can recognize an image with relatively good quality, and the image with relatively good quality may be used to generate a selected video proposed below.

Figure 4A:
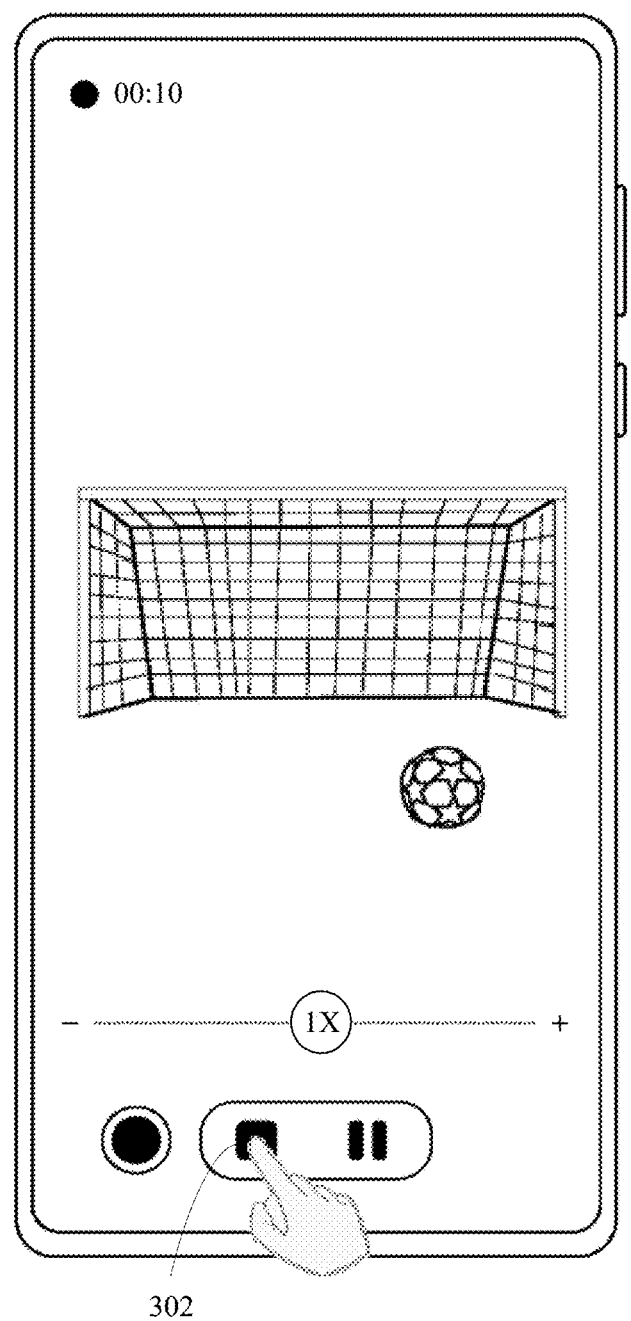
FIG. 4A to FIG. 4D are a schematic diagram of a graphical user interface of another example of "Magic Take" according to an embodiment of this application.
Figure 4B:
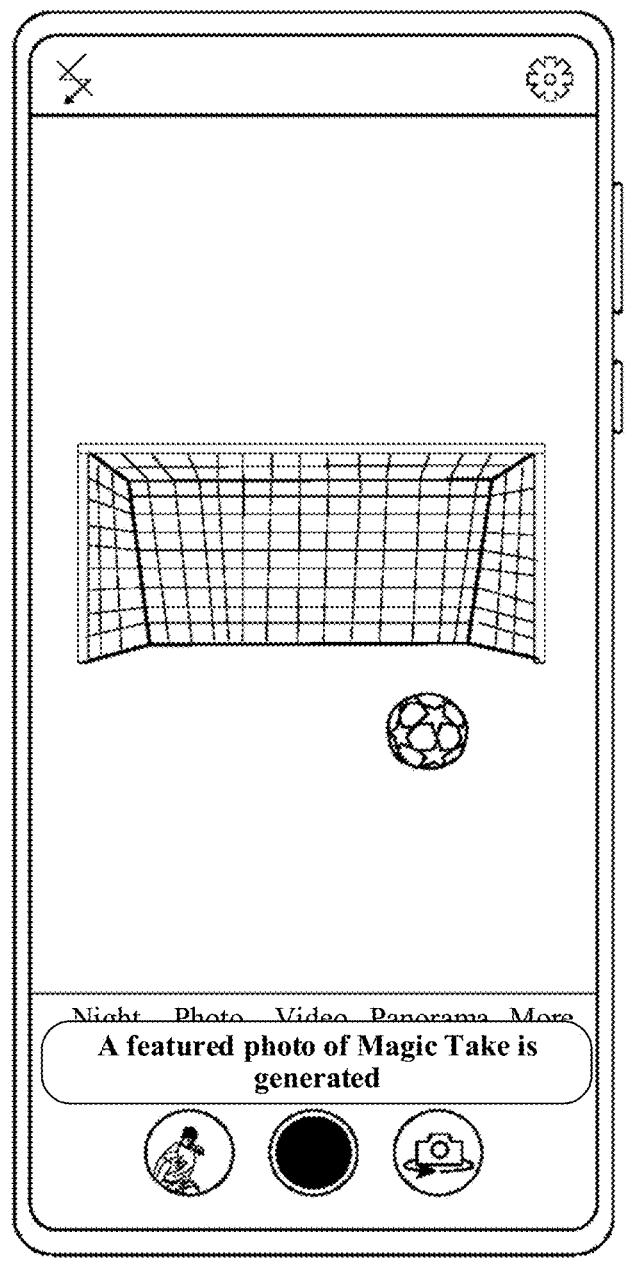

In the first application scenario, when the user shoots a video in the Magic Take mode for the first time, and as shown in FIG. 4A, the stop control 302 is tapped when shooting arrives at the 10th second, a shooting interface displayed on the mobile phone is shown in FIG. 4B, and a text of the dialog box for the generation reminder of Magic Take is that a featured photo of "Magic Take" is generated.

Figure 4C:
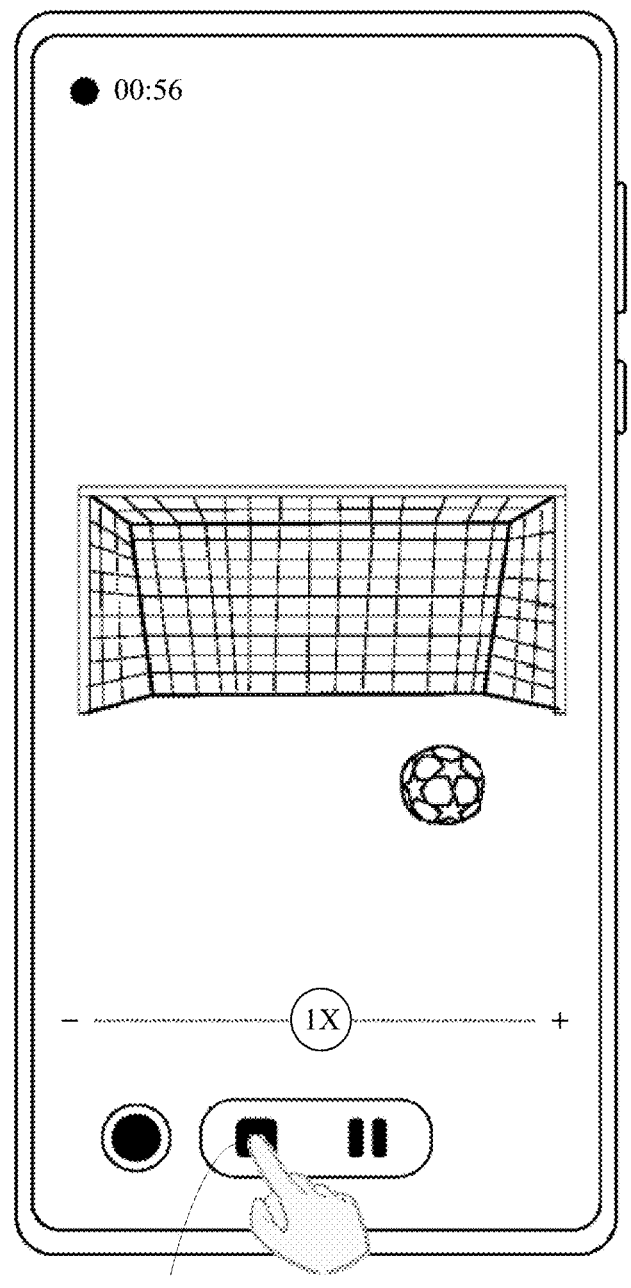
Figure 4D:
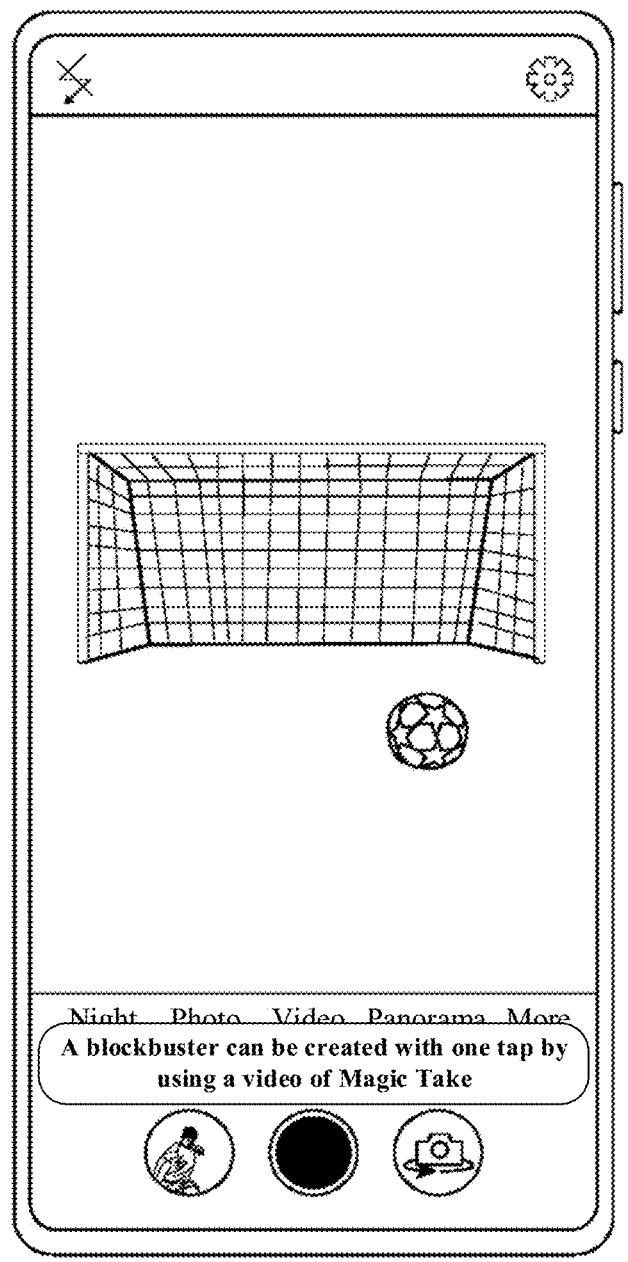

In the second application scenario, when the user shoots a video in the Magic Take mode for the first time, and as shown in FIG. 4C, the stop control 302 is tapped when shooting arrives at the 56th second, a shooting interface displayed on the mobile phone is shown in FIG. 4D, and a text of the dialog box for the generation reminder of Magic Take is that a blockbuster can be created with one tap by using a video of "Magic Take".

In addition, after the mobile phone displays the shooting interface of the mobile phone in FIG. 4B, the mobile phone may further display, after the user taps the stop control 302 shown in FIG. 4C, the shooting interface shown in FIG. 4D once after the mobile phone determines for the first time that the mobile phone shoots a video that meets the second application scenario. Alternatively, after the mobile phone determines for the first time that a video whose duration meets the video shooting duration requirement of the Magic Take mode and from which a featured image can be recognized is shot, the mobile phone displays the shooting interface shown in FIG. 3D once after the user taps the stop control 302 shown in FIG. 3C.

In addition, after the mobile phone displays the shooting interface of the mobile phone in FIG. 4D, the mobile phone may further display, after the user taps the stop control 302 shown in FIG. 4A, the shooting interface shown in FIG. 4B once after determining for the first time a video that meets the first application scenario. Alternatively, after the mobile phone determines for the first time that a video whose duration meets the video shooting duration requirement of the Magic Take mode and from which a featured image can be recognized is shot, the mobile phone displays the shooting interface shown in FIG. 3D once after the user taps the stop control 302 shown in FIG. 3C.

It should be noted that, when the user shoots a video in the Magic Take mode of the mobile phone, the mobile phone may automatically recognize a featured image in the shot video by using a recognition model. In some embodiments, a recognition model of a featured image is disposed on the mobile phone, and in a process of shooting a video, the video is input to the recognition model of the featured image, where the recognition model may score a highlight degree of an image in the input video, to obtain a highlight degree score value of the image in the video. The mobile phone may use the highlight degree score value of the image to determine the featured image in the video. Generally, a larger highlight degree score value of an image indicates a higher probability that the image belongs to a featured image.

In some embodiments, the mobile phone may be configured to obtain a fixed quantity of featured images, for example, five featured images. Based on this, the mobile phone selects five images with relatively high highlight degree score values as the featured images.

In some other embodiments, the mobile phone may not be configured with a limited quantity of featured images, and the mobile phone may select images whose highlight degree score values are higher than a specific value as featured images.

Figure 5:
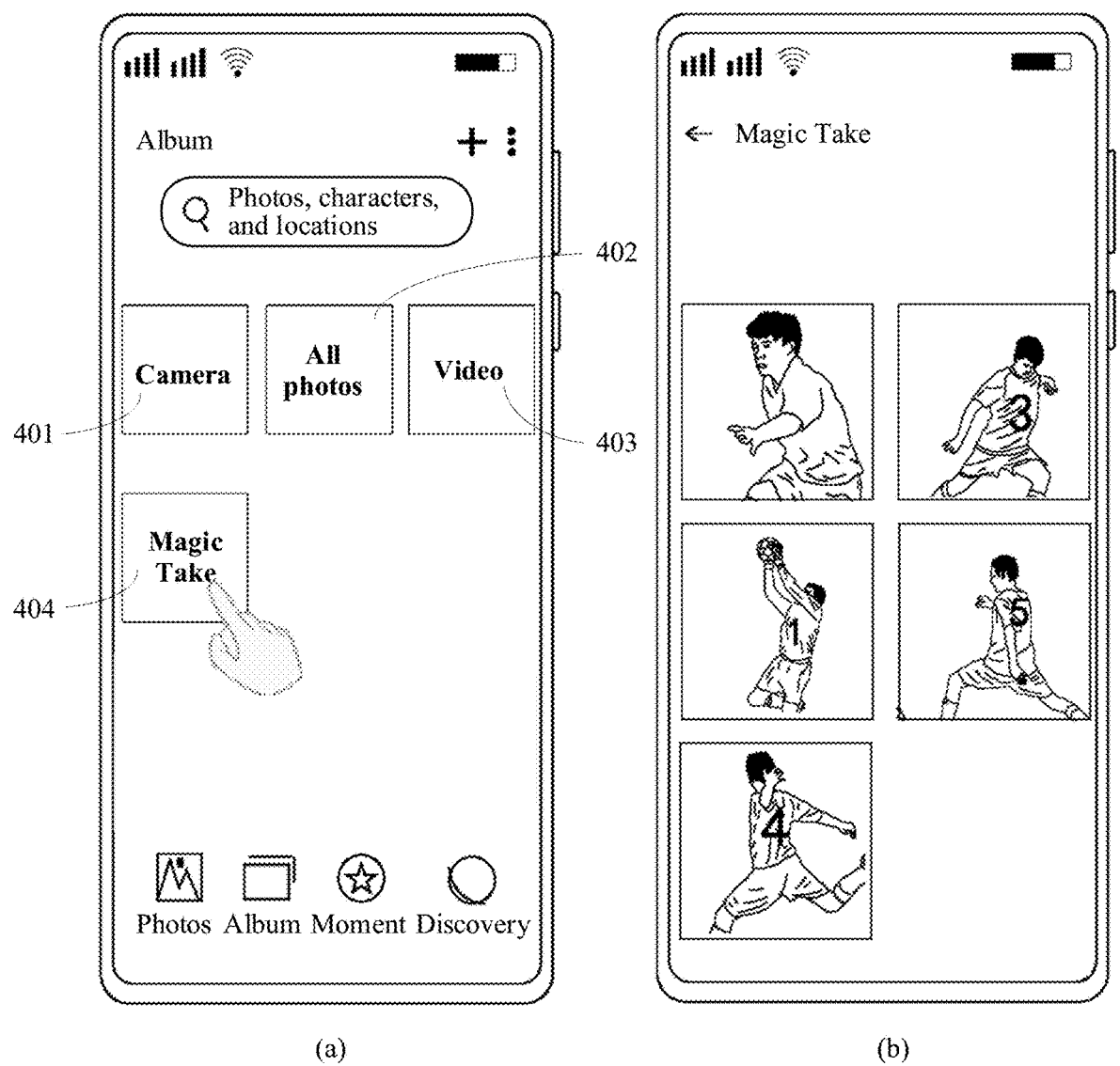
FIG. 5 is a schematic diagram of a graphical user interface of another example of "Magic Take" according to an embodiment of this application.

After video shooting by the mobile phone ends, the mobile phone obtains the shot video and one or more featured images in the video. The mobile phone may further save the shot video and the featured image to a gallery. In an example, (a) in FIG. 5 shows an album display interface of the gallery, and the album display interface shows, in a form of a folder, all photos and videos saved in the mobile phone. For example, the album display interface shown in (a) in FIG. 5 includes a camera folder 401, an all-photo folder 402, a video folder 403, and a Magic Take folder 404. Certainly, the album display interface may further include another folder. This application does not limit a folder displayed on the camera display interface.

Generally, the camera folder 401 includes all photos and videos that are shot by the camera of the mobile phone, and the all-photo folder 402 includes all photos and videos that are saved on the mobile phone, the video folder 403 includes all videos that are saved on the mobile phone, and the Magic Take folder 404 includes all featured images that are saved on the mobile phone and that are shot in a Magic Take mode.

(b) in FIG. 5 plots a display interface of the Magic Take folder, where the display interface displays thumbnails of five featured images in the foregoing mentioned 56-second video shot by the mobile phone in the Magic Take mode, and the five featured images are automatically captured by the mobile phone from the shot 56-second video.

After the mobile phone saves the shot video and the featured images in the video in the gallery, the user can view the video and the featured images of the video through the gallery application. For example, in a shooting interface shown in FIG. 6A, the user taps the control 501 for displaying the previously shot image, or in a photo display interface of the gallery shown in FIG. 6B, the user taps a cover thumbnail of a video 502. In response to the tap operation of the user, the mobile phone displays a browse interface of the video 502 on the display screen of the mobile phone.

Figure 6A:
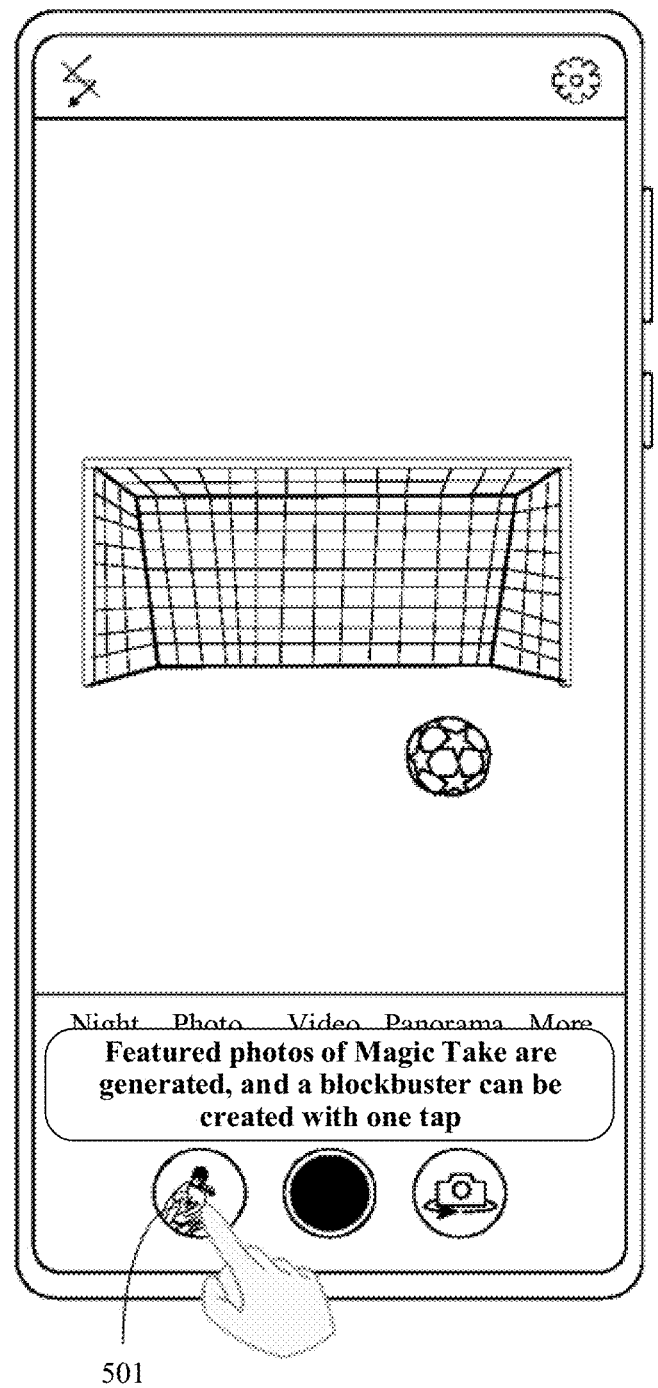
FIG. 6A to FIG. 6D are a schematic diagram of a graphical user interface of another example of "Magic Take" according to an embodiment of this application.
Figure 6B:
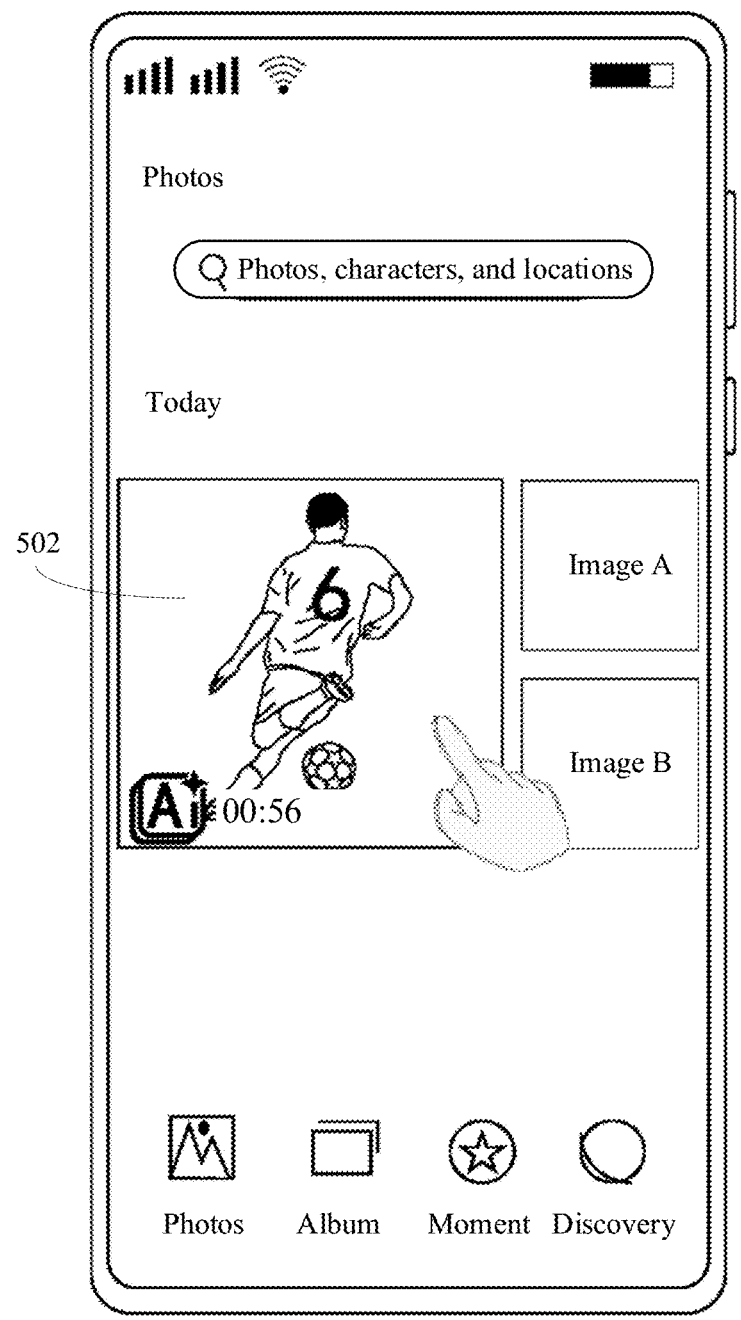

The lower-left corner of the cover thumbnail of the video 502 shown in FIG. 6B shows a video-exclusive corner mark of the "Magic Take" function. The video-exclusive corner mark is used to explain, to the user, that the video 502 corresponding to the cover thumbnail is shot by the mobile phone by using the "Magic Take" function.

The size of the cover thumbnail of the video 502 shown in FIG. 6B is different from the size of thumbnails of an image A and an image B. The image A and the image B may refer to images shot when the mobile phone does not enable the Magic Take function. For example, the cover thumbnail of the video 502 shown in FIG. 6B is greater than the thumbnail of the image A and the thumbnail of the image B. Certainly, the cover thumbnail of the video 502 shown in FIG. 6B may also be the same as a thumbnail of another photo and video (that is, a video shot when the Magic Take function is not enabled) in the gallery. This is not limited in this embodiment of this application.

Figure 6C:
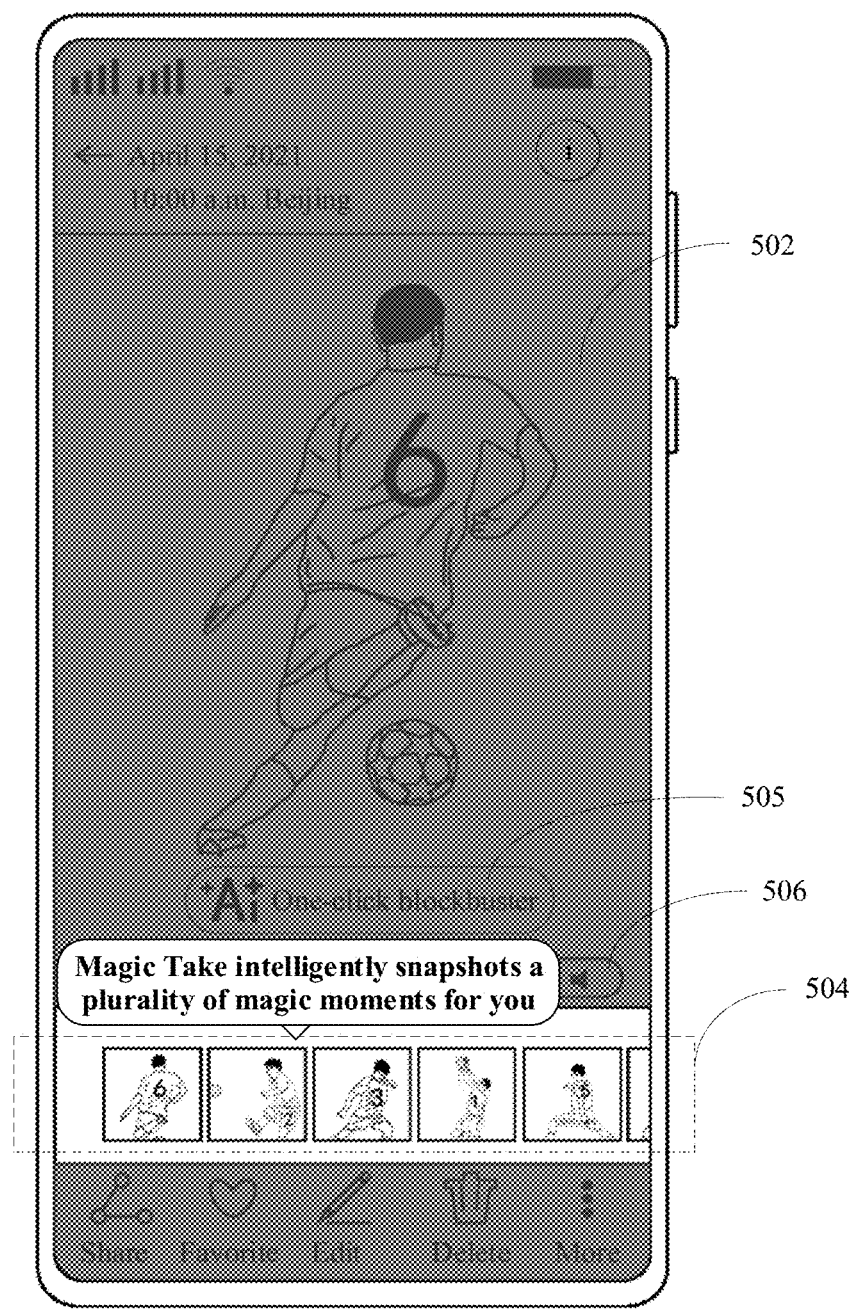
Figure 6D:
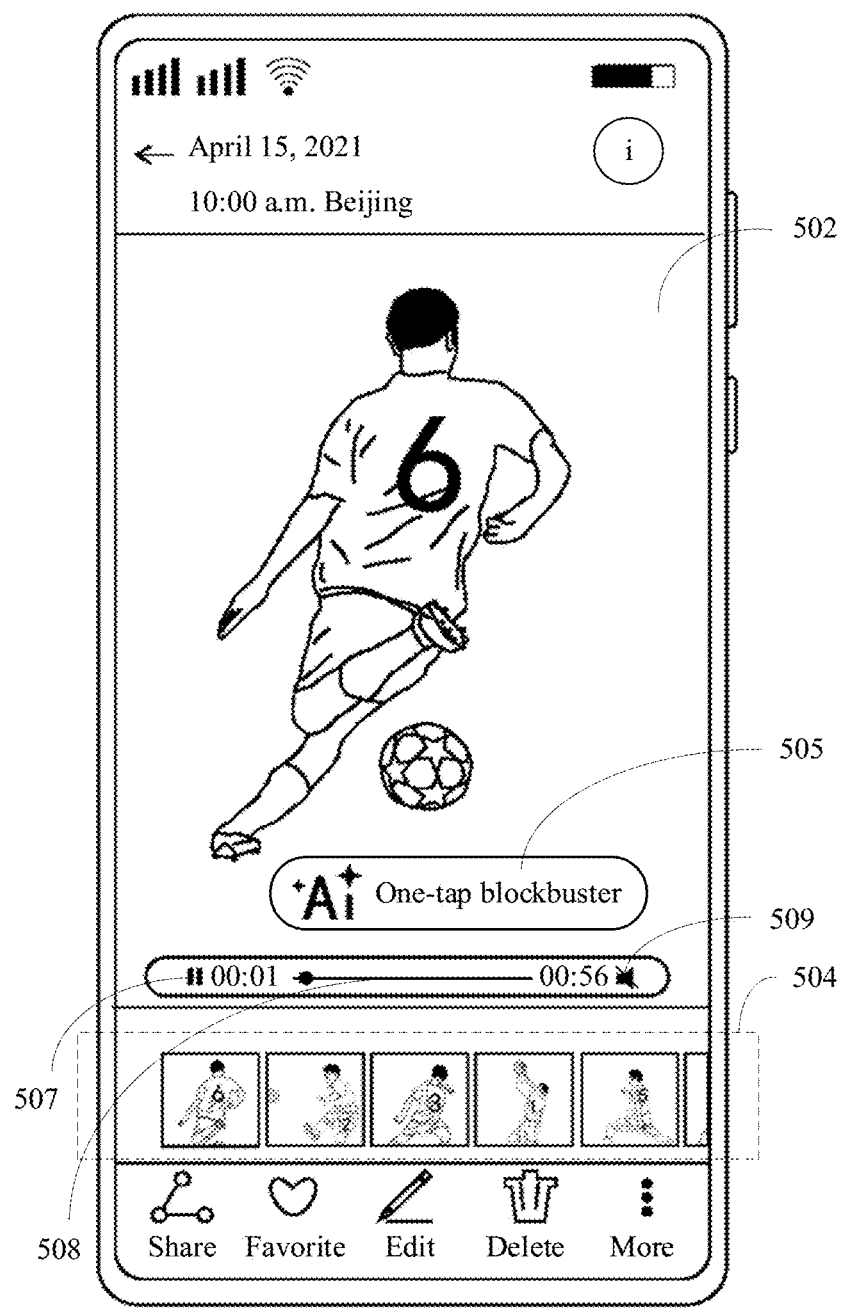

When the display screen of the mobile phone displays the browse interface of the video 502 for the first time, the browse interface displays a mask layer guide. When the display screen of the mobile phone does not display the browse interface of the video 502 for the first time, the browse interface does not display the mask layer. For example, the browse interface of the video 502 that displays the mask layer guide is shown in FIG. 6C, and the browse interface of the video 502 that does not display the mask layer guide is shown in FIG. 6D. It should be further noted that, the video 502 may be understood as a video shot by the mobile phone in the Magic Take mode for the first time. Therefore, that the display screen of the mobile phone displays the browse interface of the video 502 for the first time may be understood as that the mobile phone displays, for the first time, the video shot by the mobile phone in the Magic Take mode for the first time. In this case, the browse interface of the video displays a mask layer guide. In addition, the mobile phone displays, for the first time, the video shot by the mobile phone in the Magic Take mode for the first time, and displays the mask layer guide on the browse interface of the video, so as to remind the user of the Magic Take function.

The browse interface of the video 502 shown in FIG. 6C includes: a thumbnail area 504 of a featured image of the video 502, a control 505, and a play control 506. The thumbnail area 504 of the featured image of the video 502 is exposed and not covered by the mask layer, and another area of the display screen is covered by the mask layer.

The thumbnail area 504 of the featured image of the video 502 includes: a cover thumbnail of the video 502, and thumbnails of multiple featured images of the video 502. The cover thumbnail of the video 502 is usually in the first place, and the thumbnails of the multiple featured images may be arranged according to shooting time of the featured images, and are located after the cover thumbnail of the video 502. As described above, the featured image is a picture that is automatically recognized at a featured instant included in a video when the mobile phone shoots the video and that is extracted from the video. In addition, the browse interface of the video 502 also includes a reminder dialog box. The reminder dialog box displays a text that "Magic Take" captures many featured instants for you intelligently. Generally, as shown in FIG. 6C, the reminder dialog box is located above the thumbnail area 504 of the featured image of the video 502, and is used to remind the user of content displayed in the thumbnail area 504 of the featured image of the video 502, so as to guide the user to view the featured image of the video 502. Certainly, the text and the setting location displayed in the reminder dialog box shown in FIG. 6C are example display, and do not constitute a limitation on the reminder dialog box. The user may tap any area of the browse interface of the video 502 shown in FIG. 6C, to control the reminder dialog box to disappear. Alternatively, the mobile phone may be configured to display the reminder dialog box for specific duration, for example, 5 seconds, and then the reminder dialog box automatically disappears.

The control 505 is used to generate a selected video based on the featured image of the video 502.

The playback control 506 is used to control playback of the video 502. For example, as shown in FIG. 6D, the play control 506 includes a start or stop control 507, a slidable progress bar 508, and a speaker control 509. The start or stop control 507 is used to control playback of the video 502 or stop playback of the video 502. The speaker control 509 is used to select whether to mute playback of the video 502. The slidable progress bar 508 is used to display playback progress of the video 502, and the user may further adjust the playback progress of the video 502 by dragging a circular control on the progress bar in the left-right direction.

The browse interface of the video 502 also includes options such as sharing, favorites, editing, deleting, and more. If the user taps sharing, the video 502 can be shared. If the user taps favorites, the video 502 can be collected in a folder. If the user taps editing, the video 502 can be edited. If the user taps deleting, the video 502 can be deleted. If the user taps more, other operational functions (such as moving, replicating, adding remarks, hiding, and renaming) with respect to the video can be performed.

The browse interface of the video 502 further includes shooting information of the video 502. Generally, as shown in FIG. 6C or FIG. 6D, the shooting information of the video 502 is located above the video 502. The shooting information of the video 502 includes a shooting date, a shooting time, and a shooting address of the video 502. In addition, the browse interface of the video 502 may further include a circular control, where the circular control is filled with a letter "i". When the user taps the circular control, the mobile phone may respond to the tap operation of the user, and display attribute information of the video 502 on the browse interface of the video 502. For example, the attribute information may include a storage path and a resolution of the video 502, configuration information of the camera during shooting, and the like.

The mask layer shown in FIG. 6C belongs to a masking-out layer. A masking-out layer generally refers to a layer mask. The layer mask is a glass sheet layer covering a layer of an interface displayed on a display screen. In addition, glass sheet layers are divided into transparent, semi-transparent, and completely opaque. Semi-transparent and completely opaque mask layers can block light of the display screen, so that the interface displayed on the display screen is blurred or completely invisible to the user. The mask layer shown in FIG. 6C may be understood as a semi-transparent glass sheet layer.

The mask layer guide shown in FIG. 6C is an example presentation, and does not constitute a limitation on the mask layer guide, shown for the first time, of the browse interface of the video shot in the Magic Take mode. In some embodiments, the mask layer guide may also be set as a guide with a mask layer and another special effect, for example, a guide with a bubble and a mask layer.

In addition, the user may input an operation in any area of the browse interface of the video 502 shown in FIG. 6C, to control the mask layer to disappear. Certainly, the mobile phone may also be configured to display the mask layer for specific duration, for example, the mask layer disappears automatically in 3 seconds. After the mask layer disappears from the browse interface of the video 502 shown in FIG. 6C and the reminder dialog box disappears, the browse interface of the video 502 is shown in FIG. 6D.

It should be noted that, before the mask layer on the browse interface of the video 502 shown in FIG. 6C disappears, the video 502 is in a static state and is not played back. When the mask layer disappears, the video 502 may be played back automatically. Typically, playback of the video 502 may also be muted. Certainly, the user may control, by tapping the speaker control 509 shown in FIG. 6D, the mobile phone to play back the video 502 with sound.

The user may further perform a left-right slide operation or a tap operation in the thumbnail area 504 of the featured image of the video 502 shown in FIG. 6D. In some embodiments, the user taps a thumbnail of one featured image in the thumbnail area 504, and the mobile phone responds to the tap operation of the user, and displays, on the display screen, the featured image tapped by the user, to replace the video 502 shown in FIG. 6D. In another embodiment, the user performs a leftward or rightward slide operation in the thumbnail area 504, and the mobile phone may also respond to the slide operation of the user, and display, on the display screen, the featured image of the thumbnail area 504 following the slide direction of the user. The image corresponding to the thumbnail of the featured image displayed in the thumbnail area 504 is not saved in the gallery, but is saved in the Magic Take album. That is, in the interface shown in FIG. 6B, there is no thumbnail corresponding to the featured image. However, when the user taps the thumbnail of the video 502 to enter the browse interface of the video 502, the thumbnail of the featured image associated with the video 502 may be displayed below the browse interface of the video 502.

The user may further input a left-right slide operation in the video 502 shown in FIG. 6D, and the mobile phone responds to the slide operation of the user, to display, on the display screen, another image or video saved in the gallery of the mobile phone. In some embodiments, the user inputs a rightward slide operation in the video 502 shown in FIG. 6D, and the mobile phone displays, on the display screen, a video or an image that is next to the video 502 and that is saved in the gallery. The user inputs a leftward slide operation in the video 502 shown in FIG. 6D, and the mobile phone displays, on the display screen, a video or image that is previous to the video 502 and that is saved in the gallery. The previous video or image is a video or image whose shooting time is earlier than that of the video 502 and closest to that of the video 502, and the next video or image is a video or image whose shooting time is later than that of the video 502 and closest to that of the video 502.

It should be noted that, if the video 502 shot by the user is a video in the first application scenario mentioned above, the browse interface of the video 502 is different from those in FIG. 6C and FIG. 6D, and a difference is that the browse interface of the video 502 does not include the control 505. If the video 502 shot by the user is a video in the second application scenario mentioned above, the browse interface of the video 502 is also different from those in FIG. 6C and FIG. 6D, and a difference is that the browse interface of the video 502 does not include the thumbnail area 504.

It should be further noted that, when the user shoots a video in the Magic Take mode of the mobile phone, the mobile phone may further obtain tag data in addition to the shot video and one or more featured images in the video, where the tag data includes multiple tags (TAG) of the video. In addition, the tag data may be added to the video, and is usually located in a video header.

In a possible implementation, a plurality of tags (TAG) of the video may be determined based on level information of the video. The level information of the video may include first-level information LV0, second-level information LV1, third-level information LV2, and fourth-level information LV3.

The first-level information LV0 is used to represent a subject category of the video, and is used to provide a style or atmosphere TAG of the entire video.

The second-level information LV1 is used to represent a video scene, and is used to provide a video scene TAG.

The third-level information LV2 is used to represent a change of the video scene, and may also be understood as a change of a transition sub-lens. The third-level information LV2 information may provide a video transition location (for example, a frame number at which transition occurs) and a transition type (character protagonist switching, fast moving shot, scene category change, or image content change caused by other situations), to avoid an excessive quantity of recommended similar scenes. The LV2 information is used to represent a video scene change (which may also be briefly referred to as transition), including but not limited to one or more of the following changes: a change in a character subject (or a protagonist), a great change in image content composition, a change in a semantic scene, and a change in image brightness or color The mobile phone may use the third-level information LV2 to add a sub-lens TAG to the video when a scene change occurs in the video.

The fourth-level information LV3 is used to represent a magic moment, that is, a shooting moment of the featured image, and is used to provide a featured image TAG of the video.

The first-level information LV0, the second-level information LV1, the third-level information LV2, and the fourth-level information LV3 provide decision information in order of granularity from coarse to fine, so as to recognize the featured image in the video and generate the selected video.

Table 1 below gives examples of definitions of LV0 and LV1.

TABLE 1

| Theme category (LV0) | Scene category (LV1) |
| --- | --- |
| Character | Character and the like |
| Gourmet food | Gourmet food and the like |
| Ancient building | Ancient building and the like |
| Night scene | Fireworks, other night scenery, and the like |
| Nature | Snow scenery, plant, mountain, river, and the like |
| Chinese and western festivals | Chinese and western festivals, and the like |
| Wedding | Wedding and the like |
| Graduation | Graduation and the like |
| Birthday | Birthday and the like |
| Movement | Character, motion activity, and the like |
| Child interest | Children, cats, dogs, and the like |
| Party | Character and the like |
| Leisure | Character and the like |
| Travel | Beaches, air planes, ancient buildings, characters, mountains, and the like |
| Joyful/sentimental/dynamic rhythm | Joyful, sentimental, dynamic rhythm, leisure, and the like |

The mobile phone may use the shot video and the tag data to generate the selected video of the shot video. Certainly, when the mobile phone can recognize a featured image from the shot video, the selected video includes the featured image of the shot video, and has some special effects and music. In addition, when the mobile phone does not recognize a featured image from the shot video, but can recognize a good-quality image, the selected video generated by the mobile phone includes the good-quality image. Certainly, the selected video also has some special effects and music. It should be further noted that the tag data also includes a TAG of the good-quality image, and the TAG is used to indicate a shooting moment of the good-quality image, that is, a location thereof in the shot video.

The good-quality image mentioned in this application refers to a relatively clear image, for example, the image has a relatively high resolution; or the image is relatively complete.

The special effect mentioned in this application means that the special effect can be supported by a material, and may be presented after being added to a video frame, for example, an animation effect such as snowflake or fireworks, and a filter, a sticker, a frame, and the like. In some embodiments, the special effect may also be referred to as a style, a style theme, or the like.

The following content of this application is described by using an example in which the mobile phone generates the selected video by using the featured image.

Figure 7A:
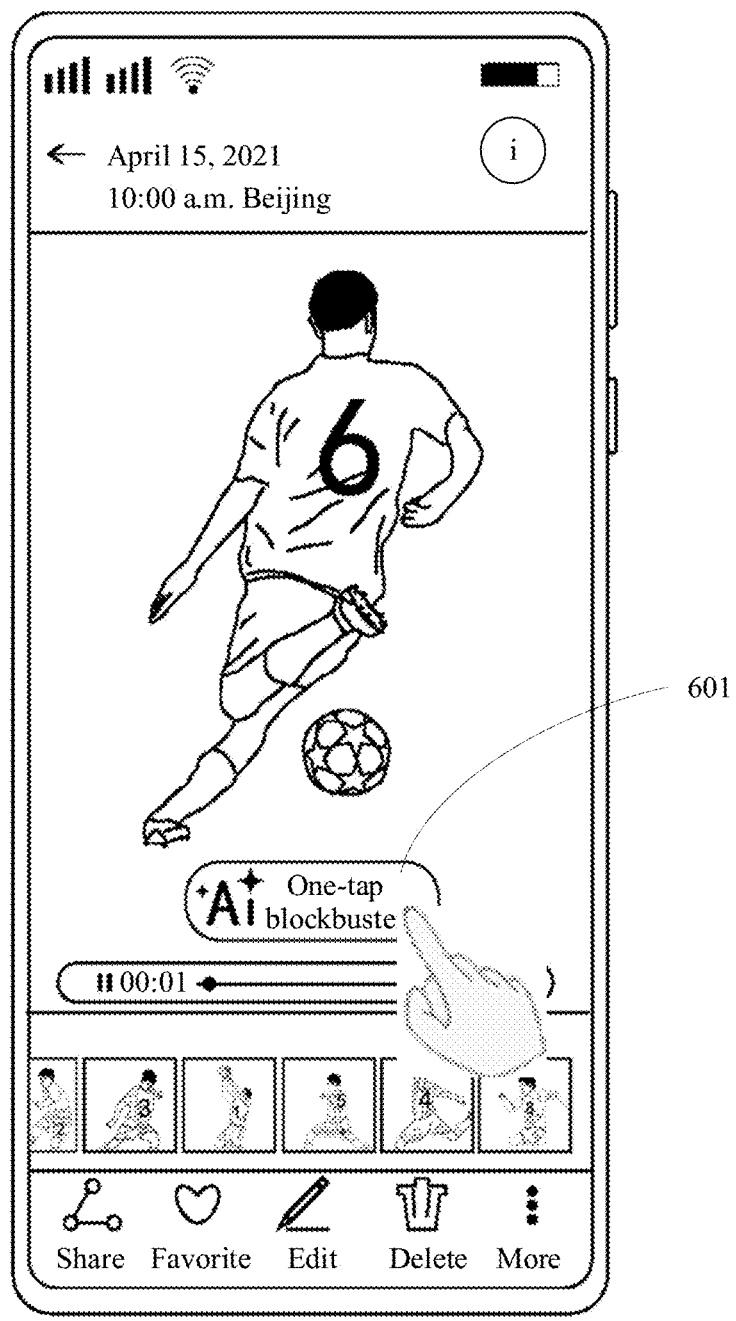
FIG. 7A to FIG. 7C are a schematic diagram of a graphical user interface of another example of "Magic Take" according to an embodiment of this application.

For example, as shown in FIG. 7A, the user taps a control 601 of the browse interface of the video. The mobile phone responds to the user's tap operation and generates a selected video of specific duration.

Figure 7B:
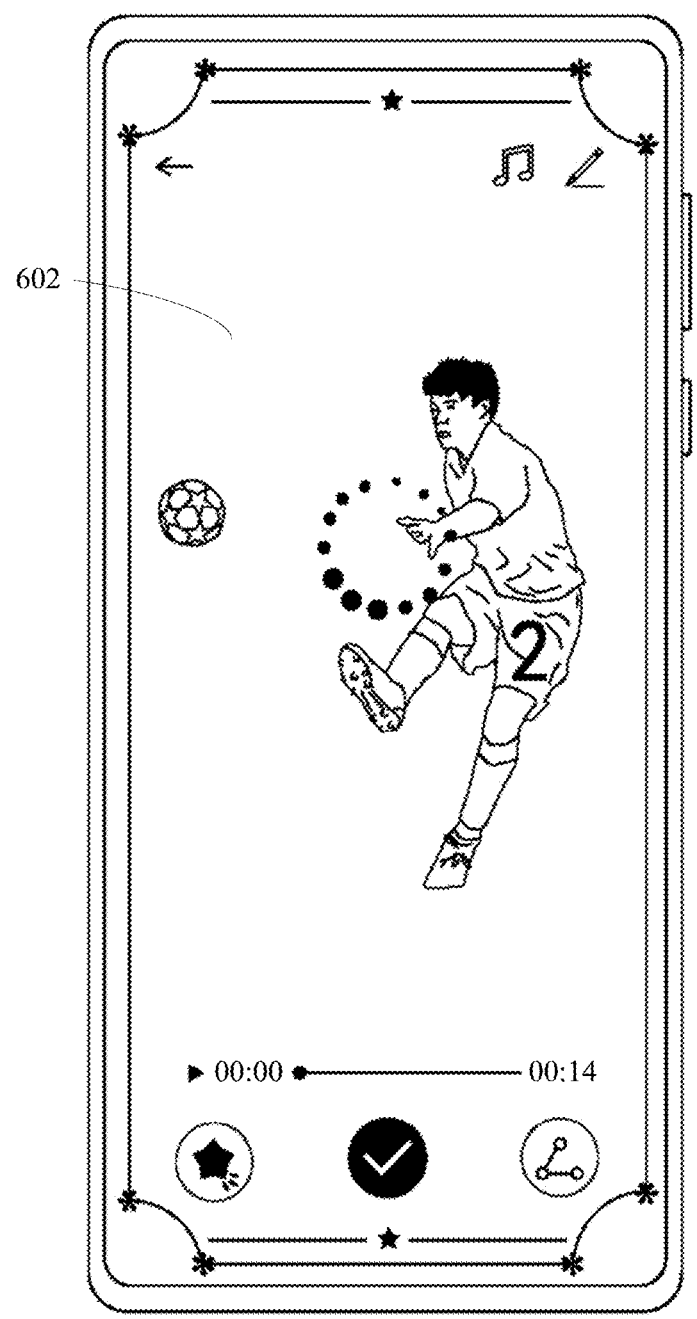

Generally, it takes a specific time to generate the selected video of the video. Therefore, as shown in FIG. 7A, after the user taps the control 601 of the browse interface of the video, the display screen of the mobile phone displays a cache interface of a selected video 602 shown in FIG. 7B. After the selected video 602 is generated, the display screen of the mobile phone displays a display interface of the selected video 602. Certainly, in a case in which performance of the mobile phone is relatively strong, as shown in FIG. 7A, after the user taps the control 601 of the browse interface of the video, the display screen of the mobile phone may not display the cache interface in FIG. 7B, but may directly display the display interface of the selected video 602.

Figure 7C:

For example, in the display interface of the selected video 602, the selected video 602 is being played. In addition, the display interface of the selected video 602 is shown in FIG. 7C, and includes: a style control 603, a save control 604, a share control 605, a music control 606, an edit control 607, and the like.

The user taps the style control 603. In response to the tap operation of the user, the mobile phone displays a plurality of video styles saved in the mobile phone. The user can choose different video styles for the selected video 602. In some embodiments, the video style may be a filter, that is, color tuning processing is performed on the selected video 602 by using the filter. A filter is one of video special effects used to achieve various special effects of the selected video 602. In some other embodiments, the video style may also be a video effect such as fast play or slow play. In some other embodiments, the video style may further refer to various themes, and different themes include content such as respective filters and music.

When the user taps the share control 605, the mobile phone may share the selected video 602 in response to the tap operation of the user.

When the user taps the music control 606, in response to the tap operation of the user, the mobile phone displays, on the display screen, an interface for adding different background music to the highlight video 602. The interface displays a plurality of background music controls, and the user may tap any background music control to select background music for the highlight short video, for example, soothing, romantic, warm, pleasant, and quiet, and add background music for the selected video 602.

When the user taps the edit control 607, the mobile phone responds to the tap operation of the user, and displays, on the display screen, a clip interface of the highlight video 602. In the editing interface, the user may input an edit operation such as clipping, segmentation, volume adjustment, and frame size adjustment for the highlight video 602.

The save control 604 is used to save the selected video 602.

Figure 8A:
FIG. 8A to FIG. 8C are a schematic diagram of a graphical user interface of another example of "Magic Take" according to an embodiment of this application.
Figure 8B:
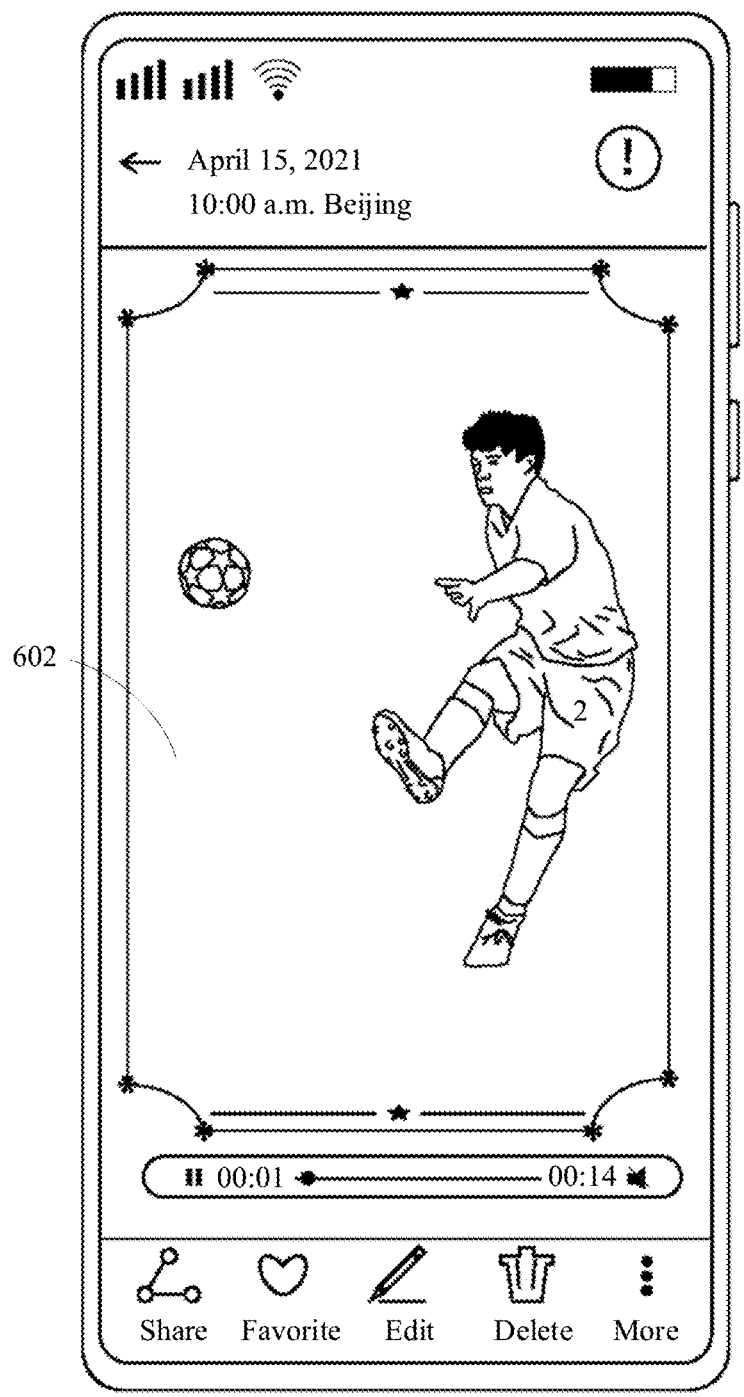
Figure 8C:
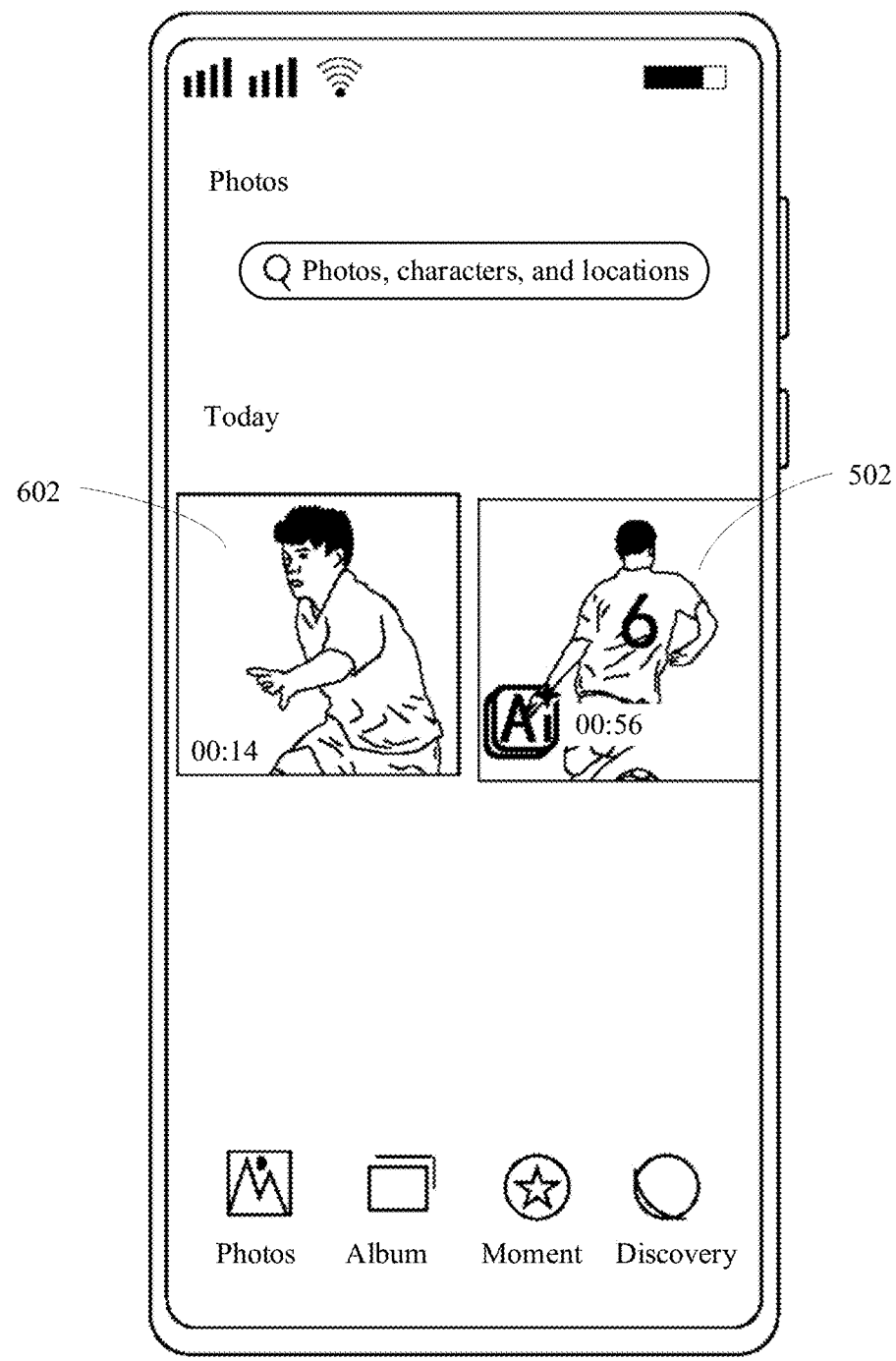

The following describes a process of saving a selected video with reference to FIG. 8A to FIG. 8C.

For example, the user taps the save control 604 of the display interface of the selected video 602 displayed in FIG. 8A. In response to the user's tap action, the mobile phone saves the selected video 602. For example, as shown in FIG. 8C, the mobile phone saves the selected video 602 in the gallery. In some embodiments, the selected video 602 may be saved following an original video 502 of the selected video 602, that is, the selected video 602 and the original video 502 are stored in a same storage area. In some other embodiments, the selected video 602 may alternatively not be saved with the original video 502 of the selected video 602, that is, the selected video 602 and the original video 502 are stored in different storage areas. It should be noted that the original video 502 refers to a video shot by the user, and the selected video 602 comes from the original video 502.

The user taps the save control 604 of the display interface of the selected video 602 displayed in FIG. 8A. In addition to saving the selected video 602 in response to the tap operation of the user, the mobile phone may further display the browse interface of the selected video 602 on the display screen. For example, the browse interface of the selected video 602 is shown in FIG. 8B. In some embodiments, in the browse interface of the selected video 602, the selected video 602 may be automatically played.

The browse interface of the selected video 602 is basically the same as the browse interface of the video 502 shown in FIG. 6D, and a difference lies that the selected video 602 is played on the browse interface of the selected video 602. For a control included in the browse interface of the selected video 602 and a function of the control, refer to the content that is of the browse interface of the video 502 and that is shown in FIG. 6D mentioned in the foregoing content. Details are not described herein again.

It should be noted that, before the user taps the save control 604 shown in FIG. 8A, the mobile phone may generate the selected video 602, but does not save the selected video 602 in an internal memory. Only after the user taps the save control 604 shown in FIG. 8A, the mobile phone further saves the generated selected video 602 in the internal memory.

Figure 9:
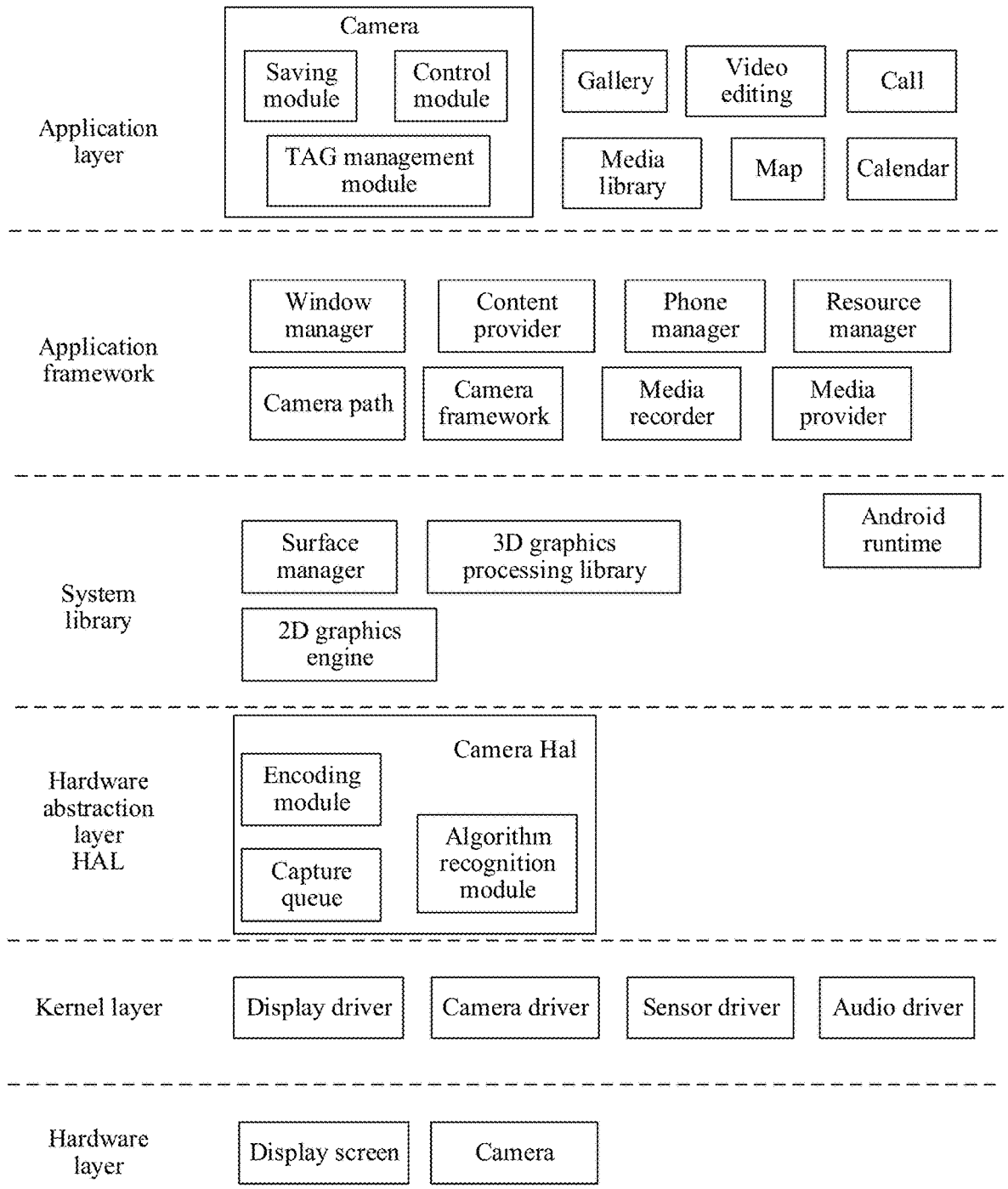
FIG. 9 is a software architecture diagram of an electronic device according to an embodiment of this application.

FIG. 9 is a schematic structural diagram of software of an electronic device according to an embodiment of this application.

The hierarchical architecture divides an operating system of the electronic device into several layers, and each layer has a clear role and division of labor. The layers communicate with each other by using a software interface. In some embodiments, the operating system of the electronic device is an Android system. The Android system may be divided into five layers: an application (application, app) layer, an application framework layer (FWK for short), a system library, a hardware abstraction layer (HAL), and a kernel layer from top to bottom.

The application layer may include a series of application packages. As shown in FIG. 9, the application package may include an application program such as camera, gallery, media library (Media Library), video editing, map, call, and calendar.

In some embodiments, the camera is used to shoot an image or a video. Certainly, the camera may respond to the user's operation and shoot a video in the Magic Take mode.

The media library (Media Library) is used to provide information such as a storage path and a name of a video and an image in the gallery application. The media library may also save some extended information of a video and an image. In some embodiments, the media library saves a group ID and a video type of the video shot by the electronic device in the Magic Take mode.

In addition, the media library may further synchronize information saved in a media provider (Media Provider). The information saved in the media library may be further provided in the gallery application. The gallery application reads the information in the media library, and displays the information, so as to be viewed and operated by the user. In some embodiments, the Media Library may also be disposed at the application framework layer.

The video editing application is used to provide functions related to video editing, for example, video editing functions such as video special effects, filters, background music, and slice clipping, and video processing functions such as video saving and video playing. In some embodiments, the video editing application may edit and obtain a selected video.

The application framework layer provides an application programming interface (application programming interface, API) and a programming framework for an application at the application layer. The application framework layer includes some predefined functions. As shown in FIG. 9, the application framework layer may include a window manager, a content provider, a phone manager, a resource manager, a camera post-processing path (Post Camera), a camera framework (CameraFwk), a media recorder (Media Recorder), a media provider (Media Provider), and the like.

The window manager is used to manage a window program. The window manager may obtain a size of the display screen, determine whether there is a status bar, lock the screen, take a screenshot, and the like.

The content provider is used to store and obtain data and make the data accessible to an application. The data may include a video, an image, an audio, calls that are made and received, a browsing history and bookmarks, an address book, and the like.

The phone manager is used to provide a communication function for the electronic device, for example, management of a call status (including answering or declining).

The resource manager provides various resources such as a localized character string, an icon, an image, a layout file, and a video file for an application.

The camera framework (CameraFwk) may also be referred to as an interface corresponding to the camera application, and is used to provide a data transmission function between the camera application and a lower-layer module. Generally, the camera application may send data to the lower-layer module by using the camera framework, so as to control the lower-layer module to collect a video or an image. The video or the image collected by the lower-layer module may also be uploaded to the camera application by using the camera framework. In some embodiments, the camera application may further send an instruction to the camera Hal by using the camera framework, to control the camera Hal to analyze a video or stop analyzing a video. Certainly, data obtained by analyzing the video by the camera Hal may also be uploaded to the camera application by using the camera framework.

The camera post-processing path (Post Camera) is used to transmit image data obtained by the lower-layer module to a corresponding module of the application layer. In some embodiments, image data of the featured image in the video may be transmitted to the camera application at the application layer by using the camera post-processing path.

The media recorder (Media Recorder) is used to record a video.

The media provider (Media Provider) is used to provide basic information of the video recorded by the media recorder to the media library.

Android runtime includes a core library and a virtual machine. The Android runtime is responsible for scheduling and management of the Android system. In some embodiments of this application, a cold start of an application runs in the Android runtime, and the Android runtime obtains an optimization-file status parameter of the application. Then, the Android runtime can determine, based on the optimization-file status parameter, whether an optimization file is out of date due to system upgrade, and return a determining result to an application control module.

The core library includes two parts: One is a function that needs to be called by a java language, and the other is a core library of Android.

The application layer and the application framework layer are run in the virtual machine. The virtual machine executes java files of the application layer and the application framework layer as binary files. The virtual machine is used to perform functions such as object lifecycle management, stack management, thread management, security and exception management, and garbage collection.

The system library may include a plurality of functional modules, for example, a surface manager (surface manager), a three-dimensional graphics processing library (for example, OpenGL ES), and a two-dimensional graphics engine (for example, SGL).

The surface manager is used to manage a display subsystem and provide fusion of 2D and 3D layers for a plurality of applications. The three-dimensional graphics processing library is used to implement three-dimensional graphics drawing, image rendering, composition, layer processing, and the like. The 2D graphics engine is a drawing engine for 2D drawing.

The hardware abstraction layer (HAL) is an interface layer located between an operating system kernel and a hardware circuit, to abstract hardware. The hardware abstraction layer hides hardware interface details of a specific platform, provides a virtual hardware platform for an operating system, and makes the operating system hardware-independent and portable on a plurality of platforms.

In some embodiments, as shown in FIG. 9, the hardware abstraction layer includes the camera Hal. The camera Hal may include functional modules such as an encoding module, a capture queue, and an algorithm recognition module.

The algorithm recognition module is an algorithm module that can load an AI algorithm, and is configured to provide a recognition function of image content of a video, and is configured to provide functions such as theme recognition, scene recognition, magic moment recognition, user operation, and camera movement recognition of the video. In some embodiments, the algorithm recognition module may not belong to the camera Hal, but belongs to a functional module of the hardware abstraction layer (HAL).

The capture queue is used to save a featured image recognized by the algorithm recognition module from the video.

The encoding module is configured to edit an image in the capture queue. In some embodiments, the featured image saved in the capture queue may be a RAW image, and the encoding module edits the RAW image to obtain an image in a JPEG format or another format.

The kernel layer is a layer between hardware and software. The kernel layer includes at least a display driver, a camera driver, a sensor driver, an audio driver, and the like. In some embodiments, the display driver is used to control the display screen to display an image. The camera driver is used to control camera operation. The sensor driver is used to control operation of a plurality of sensors, such as a pressure sensor and a touch sensor.

The hardware layer may include the foregoing hardware component of the foldable electronic device. For example, FIG. 9 shows a display screen and a camera.

It should be noted that although the embodiments of this application are described by using the Android system as an example, the basic principle thereof is also applicable to electronic devices based on operating systems such as iOS and Windows.

The following describes a procedure of the video processing method provided in the embodiment of this application with reference to FIG. 9.

The video processing method provided in the embodiment of this application may be divided into the following two phases: The first phase is: shooting a video in a Magic Take mode, to obtain a shot video and a featured image in the video. The second phase is viewing the shot video and the featured image in the video, and generating and saving a selected video. The following separately describes specific implementation processes of the foregoing two phases with reference to FIG. 10A to FIG. 11B.

Figure 10A:
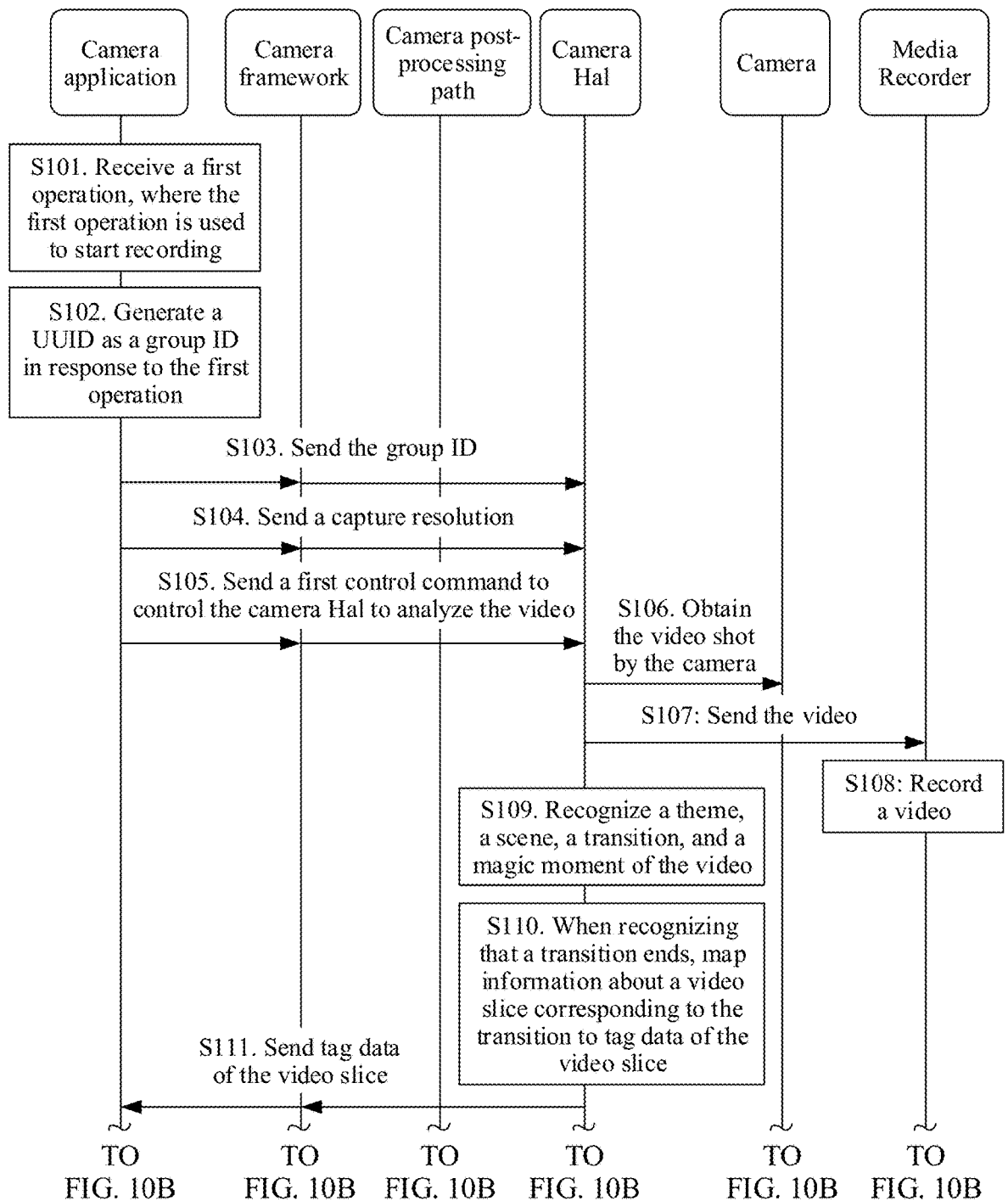
FIG. 10A and FIG. 10B are a signaling diagram of a video processing method according to an embodiment of this application.
Figure 10B:
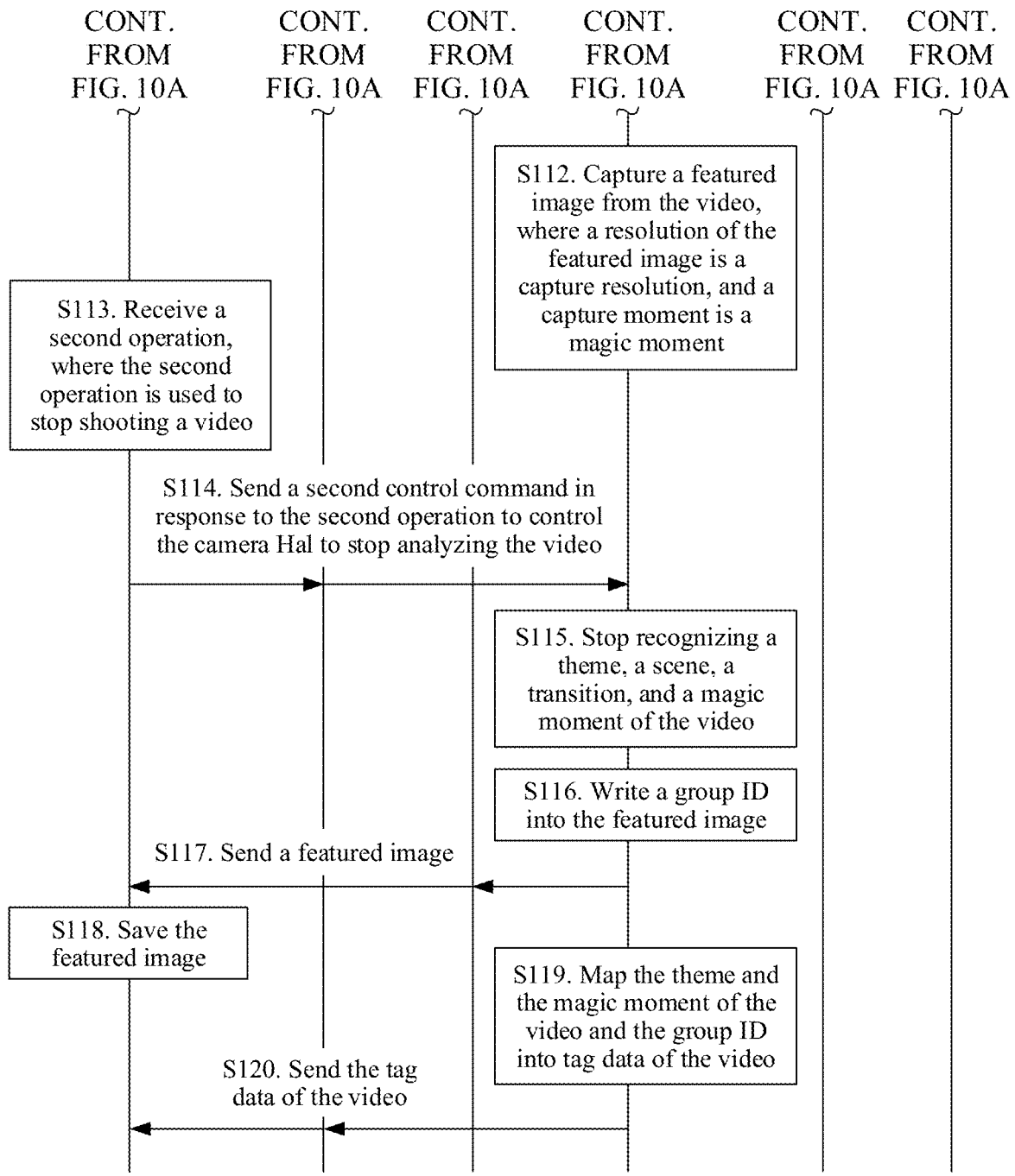

FIG. 10A and FIG. 10B are a signaling diagram in which a plurality of working modules in the software framework of the electronic device shown in FIG. 9 cooperate to execute a first-phase procedure. Referring to FIG. 10A and FIG. 10B, a method for shooting a video in the Magic Take mode, to obtain a shot video and a featured image in the video proposed in the first phase includes the following steps:

S101. The camera application receives a first operation, where the first operation is used to start recording.

As shown in FIG. 3A, the user taps the control 301 for controlling shooting to input a first operation. The camera application receives the first operation, and parses the first operation to determine that the operation is used to start recording.

It should be noted that, as shown in FIG. 2A, the user taps the camera application. In response to the tap operation, the mobile phone displays the shooting interface. The camera of the mobile phone is synchronously controlled to run to shoot a video, and the shooting interface may display the shot video to form a preview interface of the video. It should be noted that the mobile phone displays the video shot by the camera only on the preview interface of the video, but the video shot by the camera is not saved. Therefore, the operation of tapping the camera application by the user may be understood as starting preview recording.

After the camera application receives the first operation, the camera application may control to start to record the video shot by the camera, and certainly may also be used to control the mobile phone to save the video.

S102. The camera application generates a UUID as a group ID in response to the first operation.

Because the video is shot in the Magic Take mode, the shot video, the featured image in the video, and the selected video can be obtained. Therefore, the shot video, the featured image in the video, and the selected video need to be associated, so that when the video is displayed, the featured image in the video can be synchronously displayed.

In some embodiments, the electronic device associates a video and a featured image in the video by using a same group identity (Identity document, ID), and the electronic device may determine the video and the featured image that belongs to the video by using the group ID.

In some other embodiments, the electronic device associates a video, a featured image in the video, and a selected video by using a same group identity (Identity document, ID). The electronic device may determine, by using the group ID, the video, the featured image that belongs to the video, and the selected video corresponding to the video.

A universally unique identifier (Universally Unique Identifier, UUID) may be used as the group ID. Based on this, when the camera application determines, by parsing the first operation, that the user wants to shoot a video, the camera application generates a UUID in response to the first operation. It should be noted that for different videos shot by the user, the camera application needs to generate different UUIDs.

It should be noted that, before the camera application generates the UUID in response to the first operation, the camera application may further first determine that the Magic Take function of the electronic device is in the enabled state. In some embodiments, the electronic device may further determine that the rear-facing camera is started to shoot a video, and then the camera application can generate the UUID.

According to the content of the foregoing software framework, the camera application includes a control module, and the control module may generate the group ID in response to the first operation.

S103. The camera application sends the group ID to the camera Hal by using the camera framework.

As described in the content of the foregoing software framework, the application framework layer includes the camera framework. The camera application sends the group ID to the camera Hal by using the camera framework. In some embodiments, the camera application may send the group ID to the camera framework, and after receiving the group ID, the camera framework sends the group ID to the camera Hal. The control module of the camera application sends the group ID to the camera framework.

S104. The camera application sends a capture resolution to the camera Hal by using the camera framework.

Because the electronic device shoots the video in the Magic Take mode, the electronic device can also capture a featured image in the video. Therefore, the electronic device needs to set a resolution of the captured featured image. The capture resolution refers to a resolution that is set by the electronic device and that is used to capture a featured image from a video.

In some embodiments, the camera application receives the first operation, and in response to the first operation, may send the capture resolution to the camera Hal by using the camera framework. The camera application may send the capture resolution to the camera framework, and after receiving the capture resolution, the camera framework sends the capture resolution to the camera Hal. The control module of the camera application sends the capture resolution to the camera framework.

In another embodiment, as shown in FIG. 2A, the user taps the camera application. The camera application receives the tap operation, and may send the capture resolution to the camera Hal by using the camera framework in response to the tap operation. The camera application may send the capture resolution to the camera framework, and after receiving the capture resolution, the camera framework sends the capture resolution to the camera Hal. The control module of the camera application sends the capture resolution to the camera framework.

S105. The camera application sends a first control command to the camera Hal by using the camera framework, where the first control command is used to control the camera Hal to run to analyze the video.

The camera application receives the first operation, and in response to the first operation, controls the camera Hal to analyze the video shot by the camera. That the camera Hal analyzes the video may be understood as recognizing a magic moment in the video, a theme, a scene, and a transition of the video, and further capturing an image at the magic moment. The camera application may deliver the first control command, to control the camera Hal to analyze the video shot by the camera. In some embodiments, the camera application may send the first control command to the camera framework, and after receiving the first control command, the camera framework sends the first control command to the camera Hal. The control module of the camera application sends the first control command to the camera framework. In addition, the first control command may control the algorithm recognition module in the camera Hal to analyze the video.

S106. The camera Hal obtains the video shot by the camera.

It should be noted that, as shown in FIG. 2A, the user taps the camera application. The mobile phone controls the camera to collect an image in response to the operation. The camera Hal may obtain the image collected by the camera and upload it to the camera application, and the camera application forms and displays a preview interface. Therefore, when receiving the first control command, the camera Hal may continue to obtain, by performing step S106, the image collected by the camera (or may be understood as a shot video). Certainly, the video obtained by the camera Hal may be further uploaded to the camera application.

S107. The camera Hal sends the video shot by the camera to the Media Recorder.

In addition to uploading the video shot by the camera to the camera application to form the preview interface, the camera Hal may also send the video to the Media Recorder, so that the Media Recorder records the video.

S108. The Media Recorder records the video.

That the Media Recorder records the video means recording the video shot by the camera and sent by the camera Hal. Certainly, the recording the video may be understood as that the Media Recorder performs video encoding on the video shot by the camera, and saves the encoded video.

In addition, when the camera application is started, a storage location of the video shot by the camera may be specified to the Media Recorder. The Media Recorder receives the video sent by the camera Hal, and can save the video in the storage location specified in the camera application.

It should be noted that FIG. 10A shows an example of an execution sequence of step S102, step S103, step S104, and step S105. However, the execution sequence of step S102, step S103, step S104, and step S105 is not limited to the content shown in FIG. 10A. In some embodiments, step S102 and step S103 may be performed in parallel with step S104 and step S105. In another embodiment, step S103 may be performed in parallel with step S104 and step S105.

In addition, before performing step S104 and step S105, the camera application may also determine, as before performing step S102, that the Magic Take function of the electronic device is in the enabled state. Even in some embodiments, the electronic device further determines that the rear-facing camera is enabled to shoot a video. Certainly, the camera application may perform one-time detection on whether the Magic Take function of the electronic device is enabled, and whether the rear-facing camera is started to shoot a video. The camera application performs step S102 and step S103, step S104, and step S105 in parallel according to a result of the one-time detection.

S109. In response to the first control command, the camera Hal recognizes a theme, a scene, a transition, and a magic moment of the video.

Likewise, as content of the foregoing software framework, the camera Hal includes an algorithm recognition module, and the algorithm recognition module may load an AI algorithm. After the algorithm recognition module is loaded with the AI algorithm, the algorithm recognition module may recognize a magic moment of the video, a theme, a scene, and a transition in the video, and capture an image at the magic moment.

That the camera application sends the first control command to the camera Hal by using the camera framework mentioned in step S105 may be understood as that the camera application sends the first control command to the algorithm recognition module by using the camera framework. After receiving the first control command, the algorithm recognition module may load the AI algorithm. After the AI algorithm is completely loaded into the algorithm recognition module, the theme, the scene, the transition, and the magic moment of the video (which may also be referred to as a video stream) shot by the camera are dynamically recognized.

In a process in which the camera shoots the video, the algorithm recognition module analyzes, by using a specific policy, a theme and a scene of an image frame captured from the video, and recognizes a magic moment. Details are as follows:

For a theme analysis aspect of the video, the algorithm recognition module may capture image frames at different moments or consecutive image frames from the shot video, and the algorithm recognition module may analyze the captured image frames to determine the theme to which the video shot by the camera belongs.

For a scene and transition analysis of the video, the algorithm recognition module compares two frames of images to detect whether a scene change occurs (for example, whether a change in a leading role, a change in an environment, or a change in a scene occurs). If a scene change occurs, start/end time, a scene type, and a transition switching type of the scene are marked. The transition switching type may be understood as indicating a type of scene change, for example, a change in a leading role/a change in an environment/a change in a scene. The change in a scene may include a scene change of a semantic layer such as image content composition. Generally, the algorithm recognition module may determine the end time of the scene by using a time at which a scene change is determined for the next time. In addition, the algorithm recognition module may analyze a plurality of frames of images of a scene to determine a type of the scene.

For a magic moment analysis aspect of the video, the algorithm recognition module may capture image frames at different moments from the shot video, and determine, based on factors such as picture quality, a character, and an action, whether the image frame belongs to a selected image, that is, whether an occurrence moment of the image frame belongs to a magic moment. In some embodiments, the algorithm recognition module captures a plurality of frames of images from each recognized scene, and recognizes whether an occurrence moment of the image frame belongs to a magic moment.

Table 2 below provides some examples in which the algorithm recognition module recognizes a scene change and a magic moment.

TABLE 2

| Category | | Dimension | Description |
| --- | --- | --- | --- |
| Magic moment | Basic picture quality | Overall | Overall sharpness |
| | | Face | Face sharpness |
| | | Human body | Human body sharpness + hand/foot sharpness |
| | Character | Eye opening and closing | Eye opening |
| | Motions | Shooting at the basket | Highest points of layup and jump shot |
| | | Kicking the ball | Instant of kick (start action or finish action) |
| | | Badminton | Badminton play/spike (start action or finish action) |
| | | Jump | Highest point of jump |
| | | Run | Stagnation point in the air, move the leg |
| | | Look back | Moment of look backing + flowing long hair (below 45°) |

TABLE 2-continued

| Category | Dimension | Description |
| --- | --- | --- |
| Scene change | Leading role change | Shooting subject A to B |
| | Environmental change | Brightness change, color change, and quick camera movement |
| | Scene change | Scene change of a semantic layer such as image content composition |

It should be noted that the algorithm recognition module may recognize and record the theme of the video and the magic moment in the video. The recognized scene and transition may be reported to the camera application by using step S110 and step S111.

It should be further noted that the camera Hal may further recognize a shooting moment of a good-quality image frame in the video, and save the shooting moment of the good-quality image frame.

S110. When recognizing that a transition in the video ends, the camera Hal maps information about a video slice corresponding to the transition to tag data of the video slice.

In a process in which the camera shoots a video, the algorithm recognition module in the camera Hal synchronously analyzes the shot video. Therefore, when determining that a scene change occurs in the video, the algorithm recognition module may determine that a scene (or referred to as a transition) of the video has ended. The algorithm recognition module may report information about the ended scene.

Because one scene is corresponding to one video slice of a video, information about the scene is information about a video slice corresponding to a transition. Generally, the information includes the start and end time of the scene, the scene type, and the transition switching type mentioned in step S109.

In addition, the information about the video slice corresponding to the transition may be generally reported in a form of tag data. Therefore, the algorithm recognition module may map the information about the video slice corresponding to the transition to the tag data of the video slice. The tag data of the video slice includes start and end time that are of a scene corresponding to the video slice and that are recorded in a tag form, a scene type to which the scene belongs, and a transition switching type. In an example, the start/end time of the scene recorded in the form of a tag may be a start moment and a stop moment of the scene, or a start moment and a stop moment of the scene that undergo a format change, or a start moment and a stop moment of the scene that are indicated by tags.

For example, a video shot by the camera may be referred to as a video 1, the camera shoots the video 1 at 08:00:00 (absolute time), and the camera ends shooting of the first scene at 08:00:15 (absolute time). The camera Hal recognizes that the scene belongs to a character scene, and the transition switching type is a change of a leading role. Based on this, tag data of a video slice corresponding to the first scene includes that a start moment is 08:00:00, a stop moment is 08:00:15, a scene type is a character scene, and a transition switching type is a change of a leading role. In addition, the camera Hal recognizes that there is a magic moment in the first scene, and the magic moment includes 08:00:10.

Further, the camera ends shooting of the second scene in a video 2 at 08:00:35 (absolute time). A second camera Hal recognizes that the scene also belongs to a character scene, and the transition switching type is a change of a leading role. Based on this, tag data of a video slice corresponding to the second scene includes that a start moment is 08:00:15, a stop moment is 08:00:35, a scene type is a character scene, and a transition switching type is a change of a leading role. In addition, the camera Hal recognizes that there is also a magic moment in the second scene, and the magic moment includes 08:00:22.

In this example, the first two scenes in the video 1 are used as an example for description. The camera Hal may recognize another scene in the video 1 by performing step S110. This is not described one by one herein.

It should be noted that step S110 may also be selectively performed. In some embodiments, after recognizing information about a scene, the algorithm recognition module may directly report the information to the camera application by performing step S111, and does not need to perform step S110.

S111. The camera Hal sends tag data of the video slice to the camera application by using the camera framework.

The algorithm recognition module in the camera Hal sends the tag data of the video slice to the camera application by using the camera framework. In some embodiments, the algorithm recognition module sends the tag data of the video slice to the camera framework, and after receiving the tag data of the video slice, the camera framework sends the tag data of the video slice to the camera application. After receiving the tag data of the video slice, the camera application may cache the tag data of the video slice.

According to the foregoing content of the software framework, the camera application includes a TAG management module, and the camera Hal sends the tag data of the video slice to the TAG management module in the camera application by using the camera framework. After receiving the tag data of the video slice, the TAG management module may cache the tag data of the video slice.

It should be noted that, after obtaining tag data of a video slice corresponding to one transition by performing step S110, the camera Hal may report the tag data of the video slice to the camera application by performing step S111. In addition, in a process in which the camera Hal performs step S111 of reporting tag data of a video slice to the camera application, the camera Hal may further perform a video analysis procedure in parallel, that is, analyze a next scene of the video in parallel, to obtain information about the next scene.

S112. The camera Hal captures a featured image from the video, where a resolution of the featured image is a capture resolution, and a capture moment is a magic moment.

As described in the foregoing content in step S109, in a process in which the camera shoots the video, the algorithm recognition module in the camera Hal constantly recognizes a magic moment in the video, and records the magic moment. In addition, the camera Hal may further capture one or more image frames of a magic moment from the shot video at each magic moment recognized. The camera Hal may further select a high-quality image frame from a plurality of captured image frames, and the algorithm recognition module performs highlight degree scoring on the image frame to obtain a highlight degree score value. In an example, the camera Hal captures eight image frames at the magic moment from the shot video, and selects one image frame for highlight degree scoring.

A frame of image that is captured and selected by the camera Hal may be cached in a capture queue. Due to a limited quantity of image frames saved in the capture queue, in an example, the capture queue can save five image frames, the algorithm recognition module may dynamically overwrite the cached image frame in the capture queue according to the highlight degree score of the image frame. For a new image frame captured by the camera Hal, the algorithm recognition module compares a highlight degree score of the new image frame with a highlight degree score of the cached image frame in the capture queue. The algorithm recognition module controls deleting, from the capture queue, an image frame whose highlight degree score is lower than that of the new image frame, and controls caching the new image frame in the capture queue.

It should be noted that an action of capturing one or more image frames at the magic moment from the shot video and an action of selecting a good-quality image frame may be performed by another module of the camera Hal, and the module is not illustrated in the software framework diagram shown in FIG. 9.

It should be further noted that, as mentioned in step S109, the magic moment in the video is saved. In some embodiments, a quantity of magic moments saved in a video may be limited. In an example, the quantity of magic moments is limited to be within 64. Based on this, if the quantity of saved magic moments reaches the limit value, the saved magic moments may be dynamically adjusted by using the highlight degree score value of the image frame at the magic moment. It may be understood that, in the saved magic moments, a magic moment with an image frame having a low highlight degree score is deleted, and a magic moment with a high highlight degree score is saved.

It should also be noted that FIG. 10A and FIG. 10B illustrate an execution sequence of step S110 and step S111 and step S112, but the execution sequence of step S110 and step S111 and step S112 is not limited thereto. In some embodiments, step S110 and step S111 may be performed in parallel with step S112. In some other embodiments, step S110 and step S112 may be performed in parallel.

S113. The camera application receives a second operation, where the second operation is used to stop shooting a video.

If the user determines that video shooting is completed, as shown in FIG. 3C, the user may tap the stop control 302 to input the second operation. The camera application receives the second operation, and parses the second operation to determine that the operation is used to end video shooting.

S114. The camera application sends a second control command to the camera Hal by using the camera framework in response to the second operation, where the second control command is used to control the camera Hal to stop analyzing the video.

The camera application parses the second operation, and determines that the operation is used to end video shooting. In response to the second operation, the camera application delivers the second control command. In some embodiments, the camera application sends the second control command to the camera framework, and after receiving the second control command, the camera framework sends the second control command to the camera Hal. In addition, the second control command may be sent by the control module in the camera application.

After receiving the second control command, the camera Hal may respond to the second control command to stop analyzing the video. That is, recognition of a magic moment in the video, a theme, a scene, and a transition of the video, and capture of an image at the magic moment may be stopped.

In this embodiment, after video shooting stops, the camera application delivers the second control command to the camera Hal, and the camera Hal stops performing video analysis, so as to reduce power consumption of the electronic device.

S115. The camera Hal stops recognizing a theme, a scene, a transition, and a magic moment of the video.

After receiving the second control command, in response to the command, the camera Hal stops analyzing the video, that is, stops recognizing the theme, the scene, the transition, and the magic moment of the video.

It should be further noted that the camera Hal further continues to obtain the video shot during video shooting, and reports the video to the camera application, so as to maintain forming a preview interface. In some embodiments, the camera Hal may further send the obtained video to the Media Recorder, but the Media Recorder is controlled by the camera application and does not continue to record the video. In some other embodiments, the camera Hal may not send the obtained video to the Media Recorder, and the Media Recorder does not receive the video, and therefore does not continue to record the video.

S116. The camera Hal writes a group ID into the featured image.

After receiving the second control command, in addition to stopping analyzing the video, the camera Hal may further write the group ID into the featured image in response to the second control command. In some embodiments, the camera Hal writes the group ID into each frame of image cached in the capture queue. In some embodiments, that the camera Hal writes the group ID into the image frame may be understood as that the camera Hal writes the group ID into image data corresponding to the image frame. The image data corresponding to the image frame may be generally divided into a header data part and an image data part. The header data part includes attribute information of the image, and the image data part includes pixel data of the image. That the camera Hal writes the group ID into the image data corresponding to the image frame may be understood as writing the group ID into the header data part. For example, the group ID may be written to an extended field of the header data part.

It should be noted that as described in the above content of the software framework, the image frame saved in the capture queue may generally be a RAW image. The encoding module in the camera Hal may edit the RAW image to obtain an image in a JPEG format or another format. After editing the RAW image by the encoding module, the group ID may also be written into the edited image. Generally, the group ID may be written into image Exif information, which refers to the image data corresponding to the image frame proposed in the foregoing content.

In some other embodiments, that the camera Hal writes the group ID into the image frame may also be understood as that the camera Hal writes the group ID into the name of the image frame, or uses the group ID as the name of the image frame.

S117. The camera Hal sends a featured image to the camera application by using a camera post-processing path.

The camera Hal sends the featured image written with the group ID to the camera application through the camera post-processing path. In some embodiments, the camera Hal sends, to the camera post-processing path, the featured image that is written with the group ID, and after receiving the featured image that is written with the group ID, the camera post-processing path sends, to the camera application, the featured image that is written with the group ID.

S118. The camera application saves the featured image.

The camera application receives a featured image written with the group ID and saves it. According to the content of the foregoing software framework, the camera application includes a saving module, and the saving module is configured to save the featured image written with the group ID.

S119. The camera Hal maps the theme and the magic moment of the video and the group ID into tag data of the video.

As described in the content of step S109, the camera Hal saves the recognized theme and magic moment of the video. After the camera Hal receives the second control command, the camera Hal may map the theme and the magic moment of the saved video and the group ID into the tag data of the video. In some embodiments, the tag data of the video may further include a video length. In some other embodiments, the tag data of the video may further include a shooting moment of a good-quality image frame in the video.

In some embodiments, the algorithm recognition module maps the theme and the magic moment of the video and the group ID into the tag data of the video. Certainly, for a specific implementation of this step, references may be made to content mentioned in step S110, and too much description is not provided herein.

In the example mentioned in step S110, the end moment of the video 1 recognized by the camera Hal is 08:00:60, the theme of the video is a character, and magic moments include 08:00:10 and 08:00:22. Therefore, the tag data of the video obtained by the camera Hal by performing step S119 includes that the theme of the video 1 is a character, the magic moments include at least 08:00:10 and 08:00:22 and certainly also include the group ID of the video 1, and the video length is 60 seconds.

It should be noted that step S120 may also be selectively performed. In some embodiments, the camera Hal may directly report the theme and the magic moment of the video, and the group ID to the camera application by performing step S121, without performing step S120.

S120. The camera Hal sends the tag data of the video by using the camera framework.

The algorithm recognition module in the camera Hal sends the tag data of the video to the camera application by using the camera framework. In some embodiments, the algorithm recognition module sends the tag data of the video to the camera framework, and after receiving the tag data of the video, the camera framework sends the tag data of the video to the camera application. After receiving the tag data of the video, the camera application may cache the tag data of the video.

According to the foregoing content of the software framework, the camera application includes a TAG management module, and the camera Hal sends the tag data of the video to the TAG management module in the camera application by using the camera framework. After receiving the tag data of the video, the TAG management module may cache the tag data of the video.

Table 3 below shows the tag data of the video cached by the TAG management module, and an example of the tag data of the video slice mentioned in the foregoing step S110.

TABLE 3

| First-level tag | Second-level sub-tag | Description |
|---|---|---|
| Theme | | Tag video type |
| id | | Group ID |
| duration | | Video length |
| Magic moment magicMoment | | |
| | Scene scene | Video overall scene information |
| | photoCnt | Auto capture count |
| | bestShots | Magic moment time stamp |
| Video slice slices | | Slice information |
| | startTime | Start moment |
| | endTime | Stop moment |
| | scene | Scene type |
| | transition | Transition switching type |

In the example shown in Table 3, the tag data of the video may include theme, id, duration, and magic moment in the first-level tag. Certainly, the second-level sub-menu in the magic moment is included in the tag data of the video. The tag data of the video slice may include each second-level sub-tag under the video slice slices in the first-level tag, that is, startTime, endTime, scene, and transition that the video slice includes.

It should also be noted that FIG. 10B illustrates an execution sequence of step S116 and step S117 with respect to step S119 and step S120, but the execution sequence of step S116 and step S117 with respect to step S119 and step S120 is not limited thereto. In some embodiments, steps S116 and S117 may be performed in parallel with steps S119 and S120.

The foregoing content describes the method proposed in the first phase for shooting a video in a Magic Take mode to obtain a shot video and a featured image in the video, and process content of the second phase is described in the following by using some embodiments.

Figure 11A:
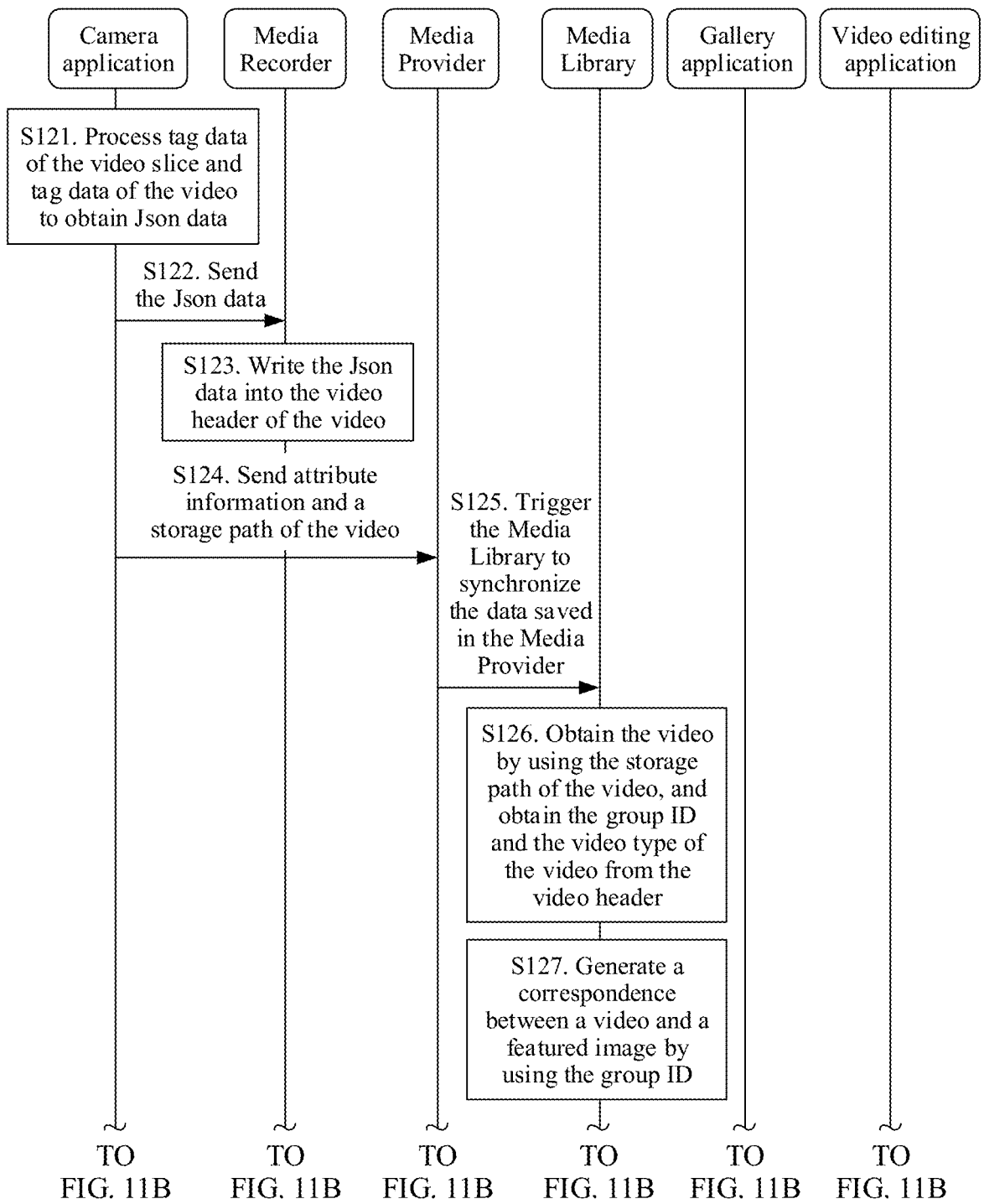
FIG. 11A and FIG. 11B are another signaling diagram of a video processing method according to an embodiment of this application.
Figure 11B:
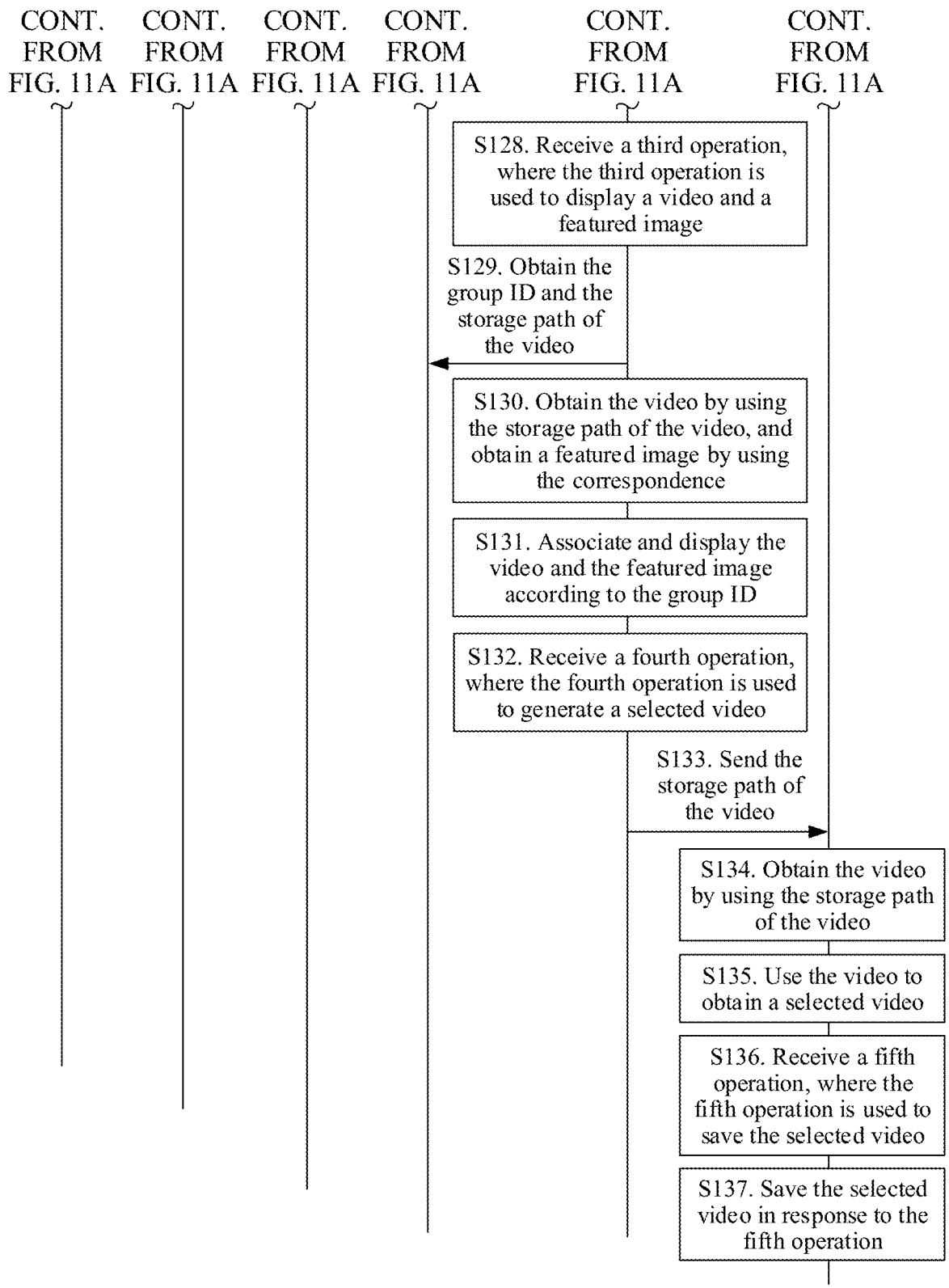

FIG. 11A and FIG. 11B are a signaling diagram in which a plurality of working modules in the software framework of the electronic device shown in FIG. 9 cooperate to execute a second-phase procedure. The plurality of working modules in the software framework of the electronic device shown in FIG. 9 may continue to perform step S121 to step S137 shown in FIG. 11A and FIG. 11B after performing step S120 shown in FIG. 10B. Referring to FIG. 11A and FIG. 11B, the method for querying a shot video and a featured image in the video, and generating and saving a selected video proposed in the second phase includes the following steps:

S121. The camera application processes tag data of the video slice and tag data of the video to obtain Json data.

The camera Hal performs step S110 to obtain tag data of a video slice corresponding to each transition of the video. In addition, each time the camera Hal recognizes end of one transition, the tag data of the video slice may be sent to the camera application by performing step S111 of the foregoing embodiment. The camera Hal may further send the tag data of the video to the camera application by performing step S120 in the foregoing embodiment. In this way, the camera application may obtain the tag data of the video and the tag data of the video slice corresponding to each transition. The camera application may process the tag data of the video slice and the tag data of the video to obtain Json data. In some embodiments, the TAG management module of the camera application receives and processes the tag data of the video slice and the tag data of the video to obtain the Json data.

It should be noted that, in the tag data of the video slice, start time and end time of a scene corresponding to the video slice are usually absolute time, and the start time and the end time belong to real moments at which the video slice is shot. Based on this, that the camera application processes the tag data of the video slice may include: The TAG management module may convert the start time and the end time of the scene corresponding to the video slice into relative time, that is, define the start time of the first image frame of the video as the zeroth second, and obtain a relative shooting moment of each image frame starting from the second image frame by using shooting duration of each image frame starting from the second image frame as a time interval.

In the example mentioned in step S110, the camera shoots the video 1 from 08:00:00 (absolute time), ends shooting of the first scene at 08:00:15 (absolute time), ends shooting of the second scene at 08:00:35 (absolute time), and ends shooting of the video 1 at 08:00:60. In this example, when processing the start time and the end time of the scene of the video slice 1 (that is, the video slice corresponding to the first scene) in the video 1, the TAG management module defines the start moment of the video 1 as the 0th second, and processes the stop moment of the video slice 1 corresponding to the first scene as the 15th second. Likewise, a start moment of the video slice 2 corresponding to the second scene is the 15th second, and stop time thereof is the 35th second. In this case, the start moment in the relative time form of the first scene is the 0th second and may be expressed as 00:00:00, and the stop moment in the relative time form is the 15th second and may be expressed as 00:00:15. The start moment in the relative time form of the second scene is the 15th second and may be expressed as 00:00:15, and the stop moment in the relative time form is the 35th second and may be expressed as 00:00:35.

It should be further noted that, after the TAG management module in the camera application completes processing the tag data of the video slice by using the foregoing content, the TAG management module may further perform format conversion on the tag data of each processed video slice and the tag data to obtain data in the Json format. Certainly, the TAG management module may further convert the tag data of each processed video slice and the tag data into data in another format. In this embodiment, the data in the Json format is used as an example for description, but this does not limit the format conversion mentioned in this step.

S122. The camera application sends the Json data to the Media Recorder.

The Media Recorder may write data into the video shot by the camera, and therefore, the camera application obtains the Json data using the foregoing step S121, and may send the Json data to the Media Recorder.

In some embodiments, the TAG management module sends the Json data to the Media Recorder.

S123. The Media Recorder writes the Json data into the video header of the video.

After receiving the Json data, the Media Recorder writes it into the video header of the video. In this embodiment, the video refers to a video file. Generally, the video file includes a video header and video content, the video header is set with a custom extension information field, and the Json data may be written to the custom extension information field in the video header.

It should be noted that, as content in step S115 in the foregoing embodiment, after the user inputs the second operation to stop shooting the video, the Media Recorder may be controlled by the camera application not to continue to record the video, or the Media Recorder does not receive the video sent by the camera Hal, and does not continue to record the video. The Media Recorder can also write the Json data into the video header of the recorded video.

In some embodiments, after the user inputs the second operation to stop shooting the video, the Media Recorder may first receive the Json data by performing step S122, and write the Json data into the video header of the recorded video by performing step S123. Then, the Media Recorder stops recording the video, and performs conventional processing on the recorded video in which the Json data is written, such as packaging and saving.

S124. The camera application sends attribute information and a storage path of the video to the Media Provider.

The video shot by the camera is saved in the internal memory of the electronic device. To facilitate management of the video saved in the internal memory, the Media Provider may establish a management library of related information of the video stored in the internal memory. Based on this, the camera application may send the attribute information and the storage path of the video shot by the camera to the Media Provider.

After receiving the attribute information and the storage path of the video, the Media Provider can store them in the management library. The attribute information of the video is used to indicate a basic attribute of the video, and may include generation time, a codec format, resolution information, and the like of the video. In some embodiments, the basic attribute of the video may further include an indication tag, and the indication tag is used to indicate that the video is shot by the electronic device in the Magic Take mode.

S125. The Media Provider triggers the Media Library to synchronize the data saved in the Media Provider.

The Media Library may obtain the data stored in the management library of the Media Provider. Therefore, the Media Provider triggers the Media Library to synchronize the data saved by the Media Provider.

The Media Provider may send its own saved data to the Media Library. In some embodiments, the Media Library may set a uniform resource identifier (Uniform Resource Identifier, URI) and monitor data of the Media Provider by using the URI. If the data stored in the Media Provider changes, the Media Provider sends the data to the Media Library.

Certainly, the Media Library may also obtain data saved in the Media Provider. In some embodiments, the Media Library monitors data of the Media Provider by using the URI. If the data stored in the Media Provider changes, the Media Library obtains the data saved in the Media Provider.

S126. The Media Library obtains the video by using the storage path of the video, and obtains the group ID and the video type of the video from the video header of the video.

The management library in the Media Provider saves limited data types, and some data cannot be saved in the management library. Therefore, the data that cannot be saved in the Media Provider is saved in the Media Library. In some embodiments, the Media Library saves the group ID and the video type of the video.

The Media Library may query a video according to a storage path of the video, and obtain the queried video; and obtain tag data from a video header of the video, and parse the tag data to obtain a group ID and a video type of the video.

It should be further noted that the data stored in the Media Library may be provided in the gallery application.

S127. The Media Library generates a correspondence between a video and a featured image by using the group ID.

The Media Library traverses the featured image saved in the electronic device, and parses the featured image, for example, parses image Exif information of the featured image, to obtain a group ID written into the featured image. In addition, the Media Library traverses the video saved in the electronic device, parses the custom extension information field in the video header of the video, and obtains the group ID in the custom extension information field. The Media Library generates the correspondence between a video and a featured image by using the group ID. The Media Library establishes the correspondence by using a video and a featured image that have a same group ID.

S128. The gallery application receives a third operation, where the third operation is used to display a video and a featured image.

As shown in FIG. 6A, the user taps the control 501 for displaying the previously shot image to input the third operation. Alternatively, on the photo display interface of the gallery shown in FIG. 6B, the user taps the cover thumbnail of the video 502 to input the third operation. By parsing the third operation, the gallery application may determine that the operation is used to display the video and the featured image.

In addition, that gallery application parses the third operation may further determine a video to be displayed as specified by the third operation.

S129. The gallery application obtains the group ID and the storage path of the video saved in the Media Library.

In response to the third operation, the gallery application traverses the information about the video saved in the Media Library, determines the information about the video specified in the third operation, and obtains the group ID and the storage path of the video.

S130. The gallery application obtains the video by using the storage path of the video, and obtains a featured image by using the correspondence between a video and a featured image.

The storage path of the video is used to indicate a storage address of the video. Therefore, the gallery application may query and obtain the video by using the storage path of the video. The gallery application obtains, by using the correspondence between a video and a featured image, a featured image corresponding to the video.

S131. The gallery application associates and displays the video and the featured image according to the group ID.

The video shot by the camera using the Magic Take module and the featured image recognized in the video are set with the same group ID. Therefore, when obtaining the video and the featured image corresponding to the video, the gallery application may perform associated display on the video and the featured image according to the group ID set for them.

An interface in which the gallery application performs associated display on the video and the featured image according to the group ID may be shown in FIG. 6C or FIG. 6D.

S132. The gallery application receives a fourth operation, where the fourth operation is used to generate a selected video.

As shown in FIG. 7A, the user taps the control 601 to input the fourth operation. By parsing the fourth operation, the gallery application may determine that the operation is used to generate the selected video.

S133. The gallery application sends the storage path of the video to the video editing application.

In response to the fourth operation, the gallery application jumps to running the video editing application to display an interface of the video editing application. The camera application jumps to a video editing application process, and the camera application sends the storage path of the video information to the video editing application.

The gallery application uses the storage path of the video information as a write parameter of the interface, and invokes the interface of the video editing application, so as to jump from the camera application to video editing and send the storage path of the video information to the video editing application.

S134. The video editing application obtains the video by using the storage path of the video.

The video editing application obtains the storage path of the video, and obtains the video by using the storage path of the video.

S135. The video editing application uses the video to obtain a selected video.

As in the content of the previous step S123, the video editing application obtains the video whose video header includes the tag data in the Json format. Based on this, the video editing application can obtain the tag data from the video header.

The video editing application parses the tag data to obtain the tag data of the video slice, and segments the video according to the start time and the end time of each video slice. The video editing application selects a high-value slice from the video that can be used for video making to generate a candidate slice set and delete slices that are not selected. In some embodiments, the video editing application may select the high-value slice by using the magic moment in the tag data.

The video editing application performs same or similar slice deduplication processing on the video slice in the candidate slice set, to remove the same or similar video slice.

The video editing application may further select a corresponding style according to a theme tag in the tag data, where each theme tag corresponds to at least one style, each style matches one piece of background music by default, and at the same time, each style corresponds to at least one piece of video editing information such as a filter, a sticker, a transition, and a special effect. After determining the background music, the video editing application determines the rhythm of joining the background music at the transition location between video slices. In addition, the video editing application may select the transition type and the like according to the theme tag, the user operation, and the camera movement tag, and select and determine the corresponding transition type from the transition resource library.

The video editing application performs slice stitching layout for the video slice. For example, an orchestration policy of the stitching layout may be: selecting high-value slices to orchestrate and stitch the slices in chronological order for video making, and adding a transition between each two video slices. A sub-lens constraint may be as follows: A made video includes 2~5 slices (at least three slices as possible), and duration of each slice is 2 seconds to 6 seconds. In addition, a background music joint point constraint may be: The slice stitching transition location matches the background music rhythm point as much as possible. A made video duration constraint may be: The made video duration is between 10 seconds and 15 seconds.

The video editing application uses the slice-stitching layout-processed video as an intermediate video and adds an additional beautification policy to the video. The another beautification policy includes adding a filter, a sticker, a special effect, and another beautification effect included in the style. The video editing application determines that the addition of the another beautification policy is completed, and the selected video is obtained.

It should be noted that, if the video slice in the candidate slice set is insufficient to generate the selected video, the video editing application may select, according to a matching degree between the scene tag and the theme tag, a video slice corresponding to a scene with a high matching degree, to generate the selected video.

It should be further noted that if the tag data does not include the magic moment, the video editing application may select, by using the shooting moment of the good-quality image frame, the video slice corresponding to the shooting moment, to generate the selected video.

S136. The video editing application receives a fifth operation, where the fifth operation is used to save the selected video.

As shown in FIG. 8A, the user taps the save control 604 to input the fifth operation. By parsing the fifth operation, the gallery application may determine that the operation is used to save the selected video.

S137. The video editing application saves the selected video in response to the fifth operation.

The video editing application saves the selected video to the internal memory, which may usually have a same storage location as that of the video, and is also a storage location specified by the camera application.

It should be further noted that, in some embodiments, before the video editing application saves the selected video, the video editing application may further write the group ID into the selected video, and specifically, may write the group ID into the video header of the selected video. The group ID can also be written into the custom extension information field in the video header.

Another embodiment of this application further provides a computer-readable storage medium. The computer-readable storage medium stores instructions. When the instructions are run on a computer or processor, the computer or processor is enabled to perform one or more steps in any one of the foregoing methods.

The computer-readable storage medium may be a non-transitory computer-readable storage medium. For example, the non-transitory computer-readable storage medium may be a ROM, a random access memory (RAM), a CD-ROM, a magnetic tape, a floppy disk, an optical data storage device, or the like.

Another embodiment of this application further provides a computer program product including instructions. When the computer program product runs on a computer or processor, the computer or processor is enabled to perform one or more steps in any one of the foregoing methods.

What is claimed is:

1. A video processing method, applied to an electronic device, wherein the video processing method comprises:
    displaying a first interface and starting to shoot a first video in response to a first operation, wherein the first interface is a shooting interface of a camera application, the first interface comprises a first control, and the first control is configured to stop shooting of the first video;
    obtaining a group ID of the first video and N magic moments of the first video;
    capturing a plurality of featured images from the first video by using the N magic moments;
    saving the first video and the featured images in response to a second operation, wherein the first video comprises the group ID, each of the featured image comprises the group ID, and the second operation is a trigger operation for the first control;

obtaining the first video and the featured images corresponding to the group ID of the first video in response to a third operation, wherein the third operation is a browse operation of the first video; and displaying a browse interface of the first video, wherein the browse interface of the first video comprises the first video and a thumbnail of the featured images.

2. The video processing method according to claim 1, further comprising:

when recognizing that a transition in the first video ends, generate tag data of the transition by using information about a video slice corresponding to the transition, wherein the transition is used to divide the first video into a plurality of video slices, and the tag data of each transition comprises information about a video slice corresponding to the transition; and when shooting of the first video ends, generating the tag data of the first video by using the N magic moments, and the group ID of the first video.

3. The video processing method according to claim 2, further comprising:

receiving, by a media recorder, the tag data of each transition and the tag data of the first video that are sent by the camera application; and writing, by the media recorder, the tag data of each transition and the tag data of the first video into the video header of the first video.

4. The video processing method according to claim 1, wherein the capturing a plurality of featured images from the first video by using the N magic moments comprises:

capturing images at each of the N magic moments from the first video; and selecting, as the featured images, a plurality of images with a high highlight degree score from the images at the magic moment.

5. The video processing method according to claim 1, further comprising:

sending, by the camera application, a storage path of the first video to a media provider when shooting of the first video ends;

saving, by the media provider, the storage path of the first video;

obtaining, by a media library, data saved in the media provider, wherein the data comprises at least the storage path of the first video;

obtaining, by the media library, the first video by using the storage path of the first video; and obtaining, by the media library, the group ID of the first video stored in the video header of the first video.

6. The video processing method according to claim 1, further comprising:

obtaining, by a gallery application, the storage path of the first video from the media library in response to the third operation; and obtaining, by the gallery application, the first video by using the storage path of the first video;

obtaining, by the gallery application, the featured image in the first video; and displaying, by the gallery application, the browse interface of the first video.

7. The video processing method according to claim 1, further comprising:

obtaining the first video in response to a generation operation of a selected video; and generating the selected video by using the first video, wherein the selected video comprises the image at the magic moment of the first video.

8. The video processing method according to claim 7, wherein the obtaining the first video in response to a generation operation of a selected video; and generating the selected video by using the first video, wherein the selected video comprises the image at the magic moment of the first video comprises:

obtaining, by a video editing application, the first video in response to the generation operation of the selected video; and generating, by the video editing application, the selected video by using the first video, wherein the selected video comprises the image at the magic moment of the first video.

9. The video processing method according to claim 8, wherein the obtaining, by a video editing application, the first video in response to the generation operation of the selected video comprises:

receiving, by the video editing application in response to the generation operation of selected video, the storage path that is of the first video and that is sent by the gallery application; and obtaining, by the video editing application, the first video by using the storage path of the first video.

10. An electronic device, comprising:

one or more processors, a memory, a camera, and a display screen; wherein the memory, the camera, and the display screen are coupled to the one or more processors, the memory is configured to store computer program code, the computer program code comprises computer instructions, and when the one or more processors execute the computer instructions, the electronic device performs the following actions:

displaying a first interface and starting to shoot a first video in response to a first operation, wherein the first interface is a shooting interface of a camera application, the first interface comprises a first control, and the first control is configured to stop shooting of the first video;

obtaining a group ID of the first video and N magic moments of the first video;

capturing a plurality of featured images from the first video by using the N magic moments;

saving the first video and the featured images in response to a second operation, wherein the first video comprises the group ID, each of the featured image comprises the group ID, and the second operation is a trigger operation for the first control;

obtaining the first video and the featured images corresponding to the group ID of the first video in response to a third operation, wherein the third operation is a browse operation of the first video; and displaying a browse interface of the first video, wherein the browse interface of the first video comprises the first video and a thumbnail of the featured images.

11. The electronic device according to claim 10, when the one or more processors execute the computer instructions, the electronic device further performs the following actions:

when recognizing that a transition in the first video ends, generate tag data of the transition by using information about a video slice corresponding to the transition, wherein the transition is used to divide the first video into a plurality of video slices, and the tag data of each transition comprises information about a video slice corresponding to the transition; and when shooting of the first video ends, generating the tag data of the first video by using the N magic moments, and the group ID of the first video.

12. The electronic device according to claim 11, when the one or more processors execute the computer instructions, the electronic device further performs the following actions:
receiving, by a media recorder, the tag data of each transition and the tag data of the first video that are sent by the camera application; and
writing, by the media recorder, the tag data of each transition and the tag data of the first video into the video header of the first video.

13. The electronic device according to claim 10, wherein the capturing a plurality of featured images from the first video by using the N magic moments comprises:
capturing images at each of the N magic moments from the first video; and
selecting, as the featured images, a plurality of images with a high highlight degree score from the images at the magic moment.

14. The electronic device according to claim 10, when the one or more processors execute the computer instructions, the electronic device further performs the following actions:
sending, by the camera application, a storage path of the first video to a media provider when shooting of the first video ends; and
saving, by the media provider, the storage path of the first video.

15. The electronic device according to claim 14, when the one or more processors execute the computer instructions, the electronic device further performs the following actions:
obtaining, by a media library, data saved in the media provider, wherein the data comprises at least the storage path of the first video;
obtaining, by the media library, the first video by using the storage path of the first video; and
obtaining, by the media library, the group ID of the first video stored in the video header of the first video.

16. The electronic device according to claim 10, when the one or more processors execute the computer instructions, the electronic device further performs the following actions:
obtaining, by a gallery application, the storage path of the first video from the media library in response to the third operation; and
obtaining, by the gallery application, the first video by using the storage path of the first video;
obtaining, by the gallery application, the featured image in the first video; and
displaying, by the gallery application, the browse interface of the first video.

17. The electronic device according to claim 10, when the one or more processors execute the computer instructions, the electronic device further performs the following actions:
obtaining the first video in response to a generation operation of a selected video; and
generating the selected video by using the first video, wherein the selected video comprises the image at the magic moment of the first video.

18. The electronic device according to claim 17, wherein the obtaining the first video in response to a generation operation of a selected video; and generating the selected video by using the first video, wherein the selected video comprises the image at the magic moment of the first video comprises:
obtaining, by a video editing application, the first video in response to the generation operation of the selected video; and
generating, by the video editing application, the selected video by using the first video, wherein the selected video comprises the image at the magic moment of the first video.

19. The electronic device according to claim 18, wherein the obtaining, by a video editing application, the first video in response to the generation operation of the selected video comprises:
receiving, by the video editing application in response to the generation operation of selected video, the storage path that is of the first video and that is sent by the gallery application; and
obtaining, by the video editing application, the first video by using the storage path of the first video.

20. A computer program product, comprising a computer program, and when the computer program is run, a electronic device is enabled to perform the following actions:
displaying a first interface and starting to shoot a first video in response to a first operation, wherein the first interface is a shooting interface of a camera application, the first interface comprises a first control, and the first control is configured to stop shooting of the first video;
obtaining a group ID of the first video and N magic moments of the first video;
capturing a plurality of featured images from the first video by using the N magic moments;
saving the first video and the featured images in response to a second operation, wherein the first video comprises the group ID, each of the featured image comprises the group ID, and the second operation is a trigger operation for the first control;
obtaining the first video and the featured images corresponding to the group ID of the first video in response to a third operation, wherein the third operation is a browse operation of the first video; and
displaying a browse interface of the first video, wherein the browse interface of the first video comprises the first video and a thumbnail of the featured images.

* * * * *